United States Patent
Park et al.

(10) Patent No.: US 11,589,349 B2
(45) Date of Patent: Feb. 21, 2023

(54) METHOD AND APPARATUS FOR TRANSMITTING AND RECEIVING SIDELINK HARQ FEEDBACK INFORMATION

(71) Applicant: KT CORPORATION, Gyeonggi-do (KR)

(72) Inventors: Ki-Hyeon Park, Seoul (KR); Ki-tae Kim, Seoul (KR); Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 151 days.

(21) Appl. No.: 17/032,457

(22) Filed: Sep. 25, 2020

(65) Prior Publication Data

US 2021/0099994 A1   Apr. 1, 2021

(30) Foreign Application Priority Data

Sep. 26, 2019  (KR) .................. 10-2019-0119163
Aug. 31, 2020  (KR) .................. 10-2020-0109791

(51) Int. Cl.
*H04W 72/04* (2009.01)
*H04L 1/18* (2006.01)
*H04W 72/0446* (2023.01)
*H04L 1/1812* (2023.01)

(52) U.S. Cl.
CPC ....... *H04W 72/0446* (2013.01); *H04L 1/1812* (2013.01); *H04W 72/0406* (2013.01)

(58) Field of Classification Search
CPC ... H04W 28/04; H04W 72/04; H04W 72/042; H04W 88/08; H04W 72/0446; H04W 72/0406; H04L 5/0007; H04L 1/1812

USPC ......................................................... 370/329
See application file for complete search history.

(56) References Cited

U.S. PATENT DOCUMENTS

| | | | |
|---|---|---|---|
| 2013/0315124 A1* | 11/2013 | Rapaport | H04W 72/042 370/312 |
| 2016/0066337 A1* | 3/2016 | Sartori | H04W 72/0406 370/329 |
| 2019/0364588 A1* | 11/2019 | Lu | H04W 88/08 |
| 2020/0059915 A1* | 2/2020 | Lee | H04W 72/0406 |

(Continued)

OTHER PUBLICATIONS

3GPP TSG RAN WG1 Ad-Hoc Meeting 1901, Taipei, Taiwan, Jan. 21-25, 2019, R1-1901146, Agenda item: 7.2.4.1.2, Source: ITL, Title: Discussion on NR V2X HARQ Mechanism. (Year: 2019).*

(Continued)

*Primary Examiner* — Peter G Solinsky
*Assistant Examiner* — Sanjay K Dewan
(74) *Attorney, Agent, or Firm* — Invenstone Patent, LLC

(57) ABSTRACT to the provided are a method and an apparatus for transmitting/receiving sidelink HARQ feedback information. The method for transmitting the HARQ feedback information for sidelink transmission by a user equipment (UE) may include receiving configuration information for a sidelink resource pool for the sidelink transmission, receiving a physical sidelink shared channel (PSSCH) from another UE through a resource allocated in the sidelink resource pool, and transmitting the HARQ feedback information for reception of the PSSCH through a physical sidelink feedback channel (PSFCH) resource allocated in the sidelink resource pool.

15 Claims, 18 Drawing Sheets

(56) References Cited

U.S. PATENT DOCUMENTS

2020/0112400 A1* 4/2020 Lee .................... H04W 72/0473
2020/0178039 A1* 6/2020 Lee ....................... H04L 1/1819
2020/0187252 A1* 6/2020 Lee .................... H04B 17/3913
2020/0374978 A1* 11/2020 Panteleev ............. H04W 72/02

OTHER PUBLICATIONS

3GPP TSG RAN WG1 Meeting #94bis, Chengdu, China, Oct. 8-12, 2018, Agenda item: 7.2.4.1.1, Source: Huawei, HiSilicon, Title: Support for sidelink unicast, groupcast and broadcast. (Year: 2018).*
3GPP TSG RAN WG1 #98bis, Chongqing, China, Oct. 14-20, 2019, R1-1910299, Title: Discussion on PHY procedure for sidelink, Source: ZTE, Sanechips, Agenda item: 7.2.4.5. (Year: 2019).*
3GPP TSG RAN WG1 # 96bis, Xi'an, China, Apr. 8-12, 2019, R1-1905892, Agenda item: 7.2.4.5, Source: LG Electronics, Title: Feature lead summary #2 for agenda item 7.2.4.5, Physical layer procedures for sidelink. (Year: 2019).*

* cited by examiner

METHOD AND APPARATUS FOR TRANSMITTING AND RECEIVING SIDELINK HARQ FEEDBACK INFORMATION

CROSS REFERENCE TO RELATED APPLICATION

This application claims priority from Korean Patent Application No. 10-2019-0119163 filed on Sep. 26, 2019 and Korean Patent Application No. 10-2020-0109791 filed on Aug. 31, 2020, both of which are hereby incorporated by reference for all purposes as if fully set forth herein.

BACKGROUND

Field

Embodiments propose a method and apparatus for transmitting and receiving sidelink HARQ feedback information in a next-generation radio access network (hereinafter, referred to as "new radio or NR").

Description of Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, sub-frame, Transmission Time Interval (TTI), etc.) as a method for efficiently satisfying each usage scenario requirement through a frequency band constituting any NR system.

In consideration of this aspect, it is necessary to design a sidelink, which is a radio link between terminals (user equipments: UEs), for providing V2X service in the NR, that is, for setting up a radio resource for transmitting HARQ ACK/NACK feedback information for NR sidelink transmission.

BRIEF SUMMARY

Embodiments of the present disclosure provide a method and apparatus for preventing collision with a sidelink SS/PSBCH block (S-SSB) that may occur in transmitting HARQ feedback information for reception of a sidelink data channel in the NR environment.

According to one aspect, the embodiments provide a method for a user equipment (UE) to transmit HARQ feedback information for sidelink transmission. The method may include receiving configuration information for a sidelink resource pool for the sidelink transmission, receiving a sidelink data channel (physical sidelink shared channel: PSSCH) from another UE through a resource allocated in a sidelink resource pool, and transmitting the HARQ feedback information for reception of the PSSCH through a physical sidelink feedback channel (PSFCH) resource allocated in the sidelink resource pool, wherein the sidelink resource pool includes a set of slots excluding slots in which a sidelink SS/PSBCH block (S-SSB) is configured.

According to another aspect, the embodiments provide a method for a base station to control transmission of HARQ feedback information for sidelink transmission of a UE. The method may include transmitting configuration information for a sidelink resource pool for the sidelink transmission, and transmitting configuration information for a physical sidelink feedback channel (PSFCH) resource for transmission of the PSFCH in the sidelink resource pool, wherein the configuration information for the sidelink resource pool and the configuration information for the PSFCH resource are used for a UE to receive a sidelink data channel (physical sidelink shared channel: PSSCH) from another UE, and transmit the HARQ feedback information for the received PSSCH through the PSFCH resource, and the sidelink resource pool includes a set of slots excluding slots in which a sidelink SS/PSBCH block (S-SSB) is configured.

According to still another aspect, the embodiments provide a user equipment (UE) for transmitting HARQ feedback information for sidelink transmission. The UE may include a receiver for receiving configuration information for a sidelink resource pool for sidelink transmission and receiving a sidelink data channel (physical sidelink shared channel: PSSCH) from another UE through a resource allocated in the sidelink resource pool, and a transmitter for transmitting the HARQ feedback information for reception of the PSSCH through a PSFCH resource allocated in the sidelink resource pool, wherein the sidelink resource pool includes a set of slots excluding slots in which a sidelink SS/PSBCH block (S-SSB) is configured.

According to still another aspect, the embodiments provide a base station to control transmission of HARQ feedback information for sidelink transmission of a UE. The base station may include a transmitter for transmitting configuration information for a sidelink resource pool for the sidelink transmission and transmitting configuration information for a physical sidelink feedback channel (PSFCH) resource for transmission of the PSFCH in the sidelink resource pool, and a controller for controlling operation of the transmitter, wherein the configuration information for the sidelink resource pool and the configuration information for the PSFCH resource are used for a UE to receive a sidelink data channel (physical sidelink shared channel: PSSCH) from another UE and transmit the HARQ feedback information for the received PSSCH through the PSFCH resource, and the sidelink resource pool includes a set of slots excluding slots in which a sidelink SS/PSBCH block (S-SSB) is configured.

According to the disclosed embodiments, it is possible to provide a method and apparatus capable of preventing collision with a sidelink SS/PSBCH block (S-SSB) that may occur when transmitting HARQ feedback information for reception of a sidelink data channel in a next-generation radio access network.

DESCRIPTION OF DRAWINGS

The above and other aspects, features, and advantages of the present disclosure will be more apparent from the following detailed description taken in conjunction with the accompanying drawings, in which.

DETAILED DESCRIPTION

Figure 1:
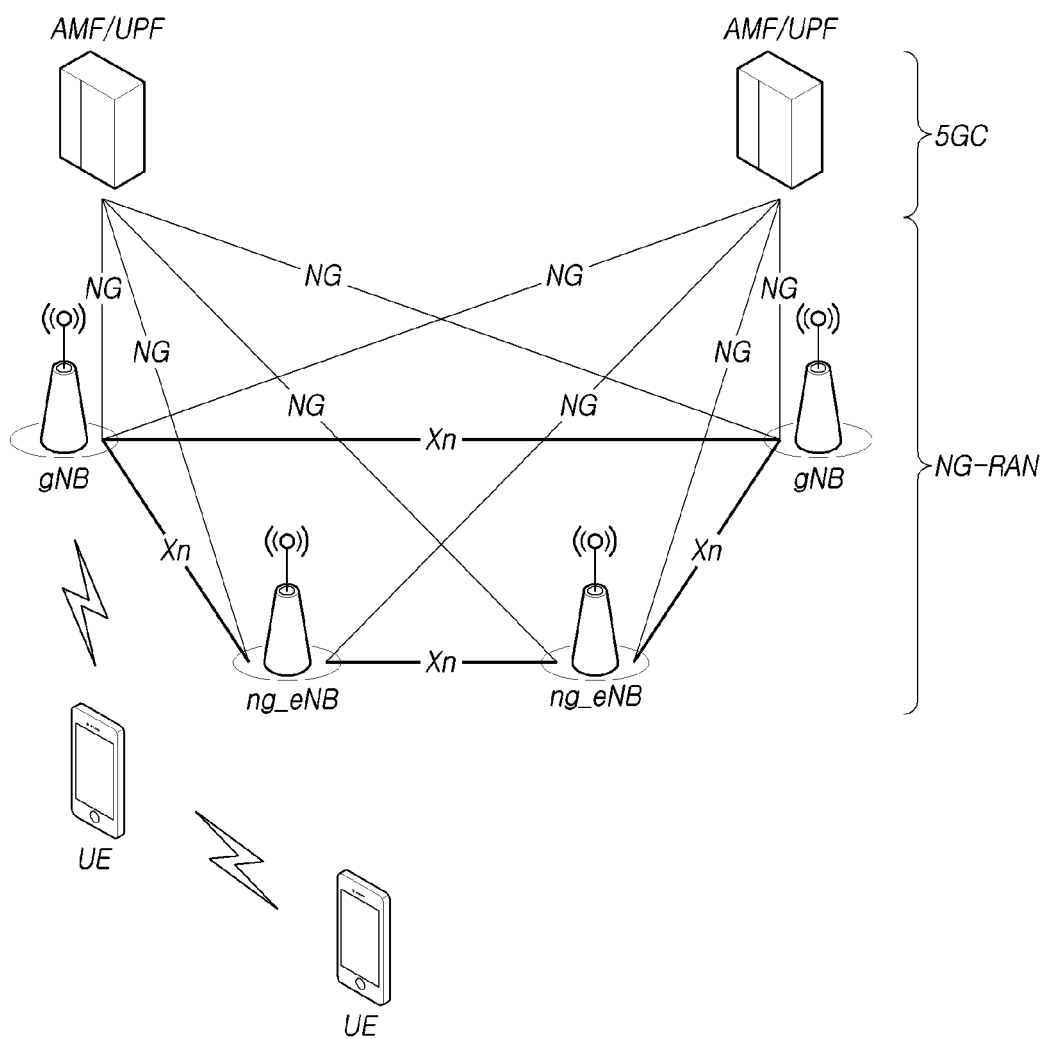
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized. Further, the embodiments may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a cyclic prefix (CP)-OFDM waveform using a cyclic prefix for downlink transmission and uses CP-OFDM or discrete Fourier transform spread (DFT)-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
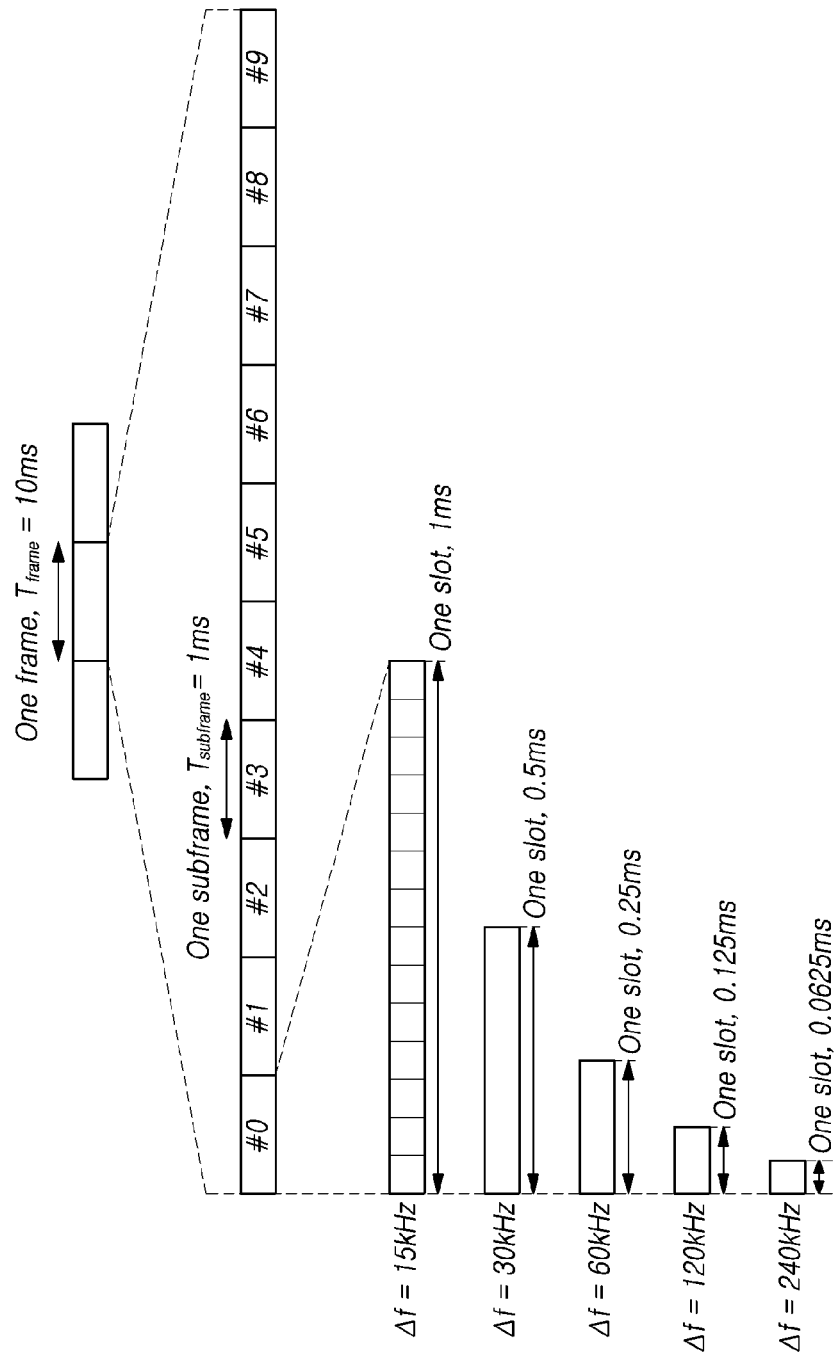
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR frame structure, a frame is defined to include 10 sub-frames each having the same length of 1 ms and has a length of 10 ms. One frame may be divided into half frames of 5 ms, and each half frame includes 5 sub-frames. In the case of a subcarrier spacing of 15 kHz, one sub-frame includes one slot, and each slot includes 14 OFDM symbols. FIG. 2 is a view for explaining a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the sub-frame. On the other hand, in the case of a numerology having a subcarrier spacing of 30 kHz, the slot includes 14 OFDM symbols, but one sub-frame may include two slots each having a length of 0.5 ms. That is, the sub-frame and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct (e.g., inform or direct) the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
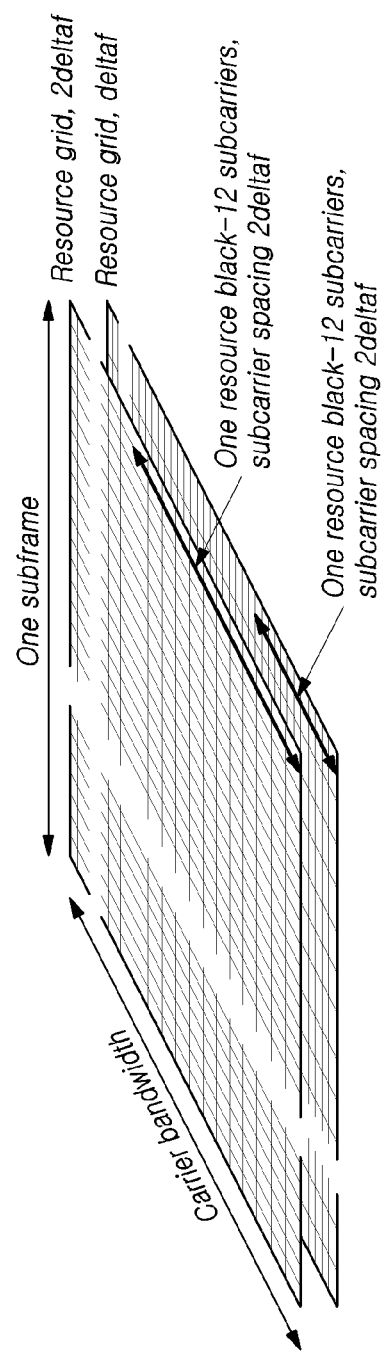
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
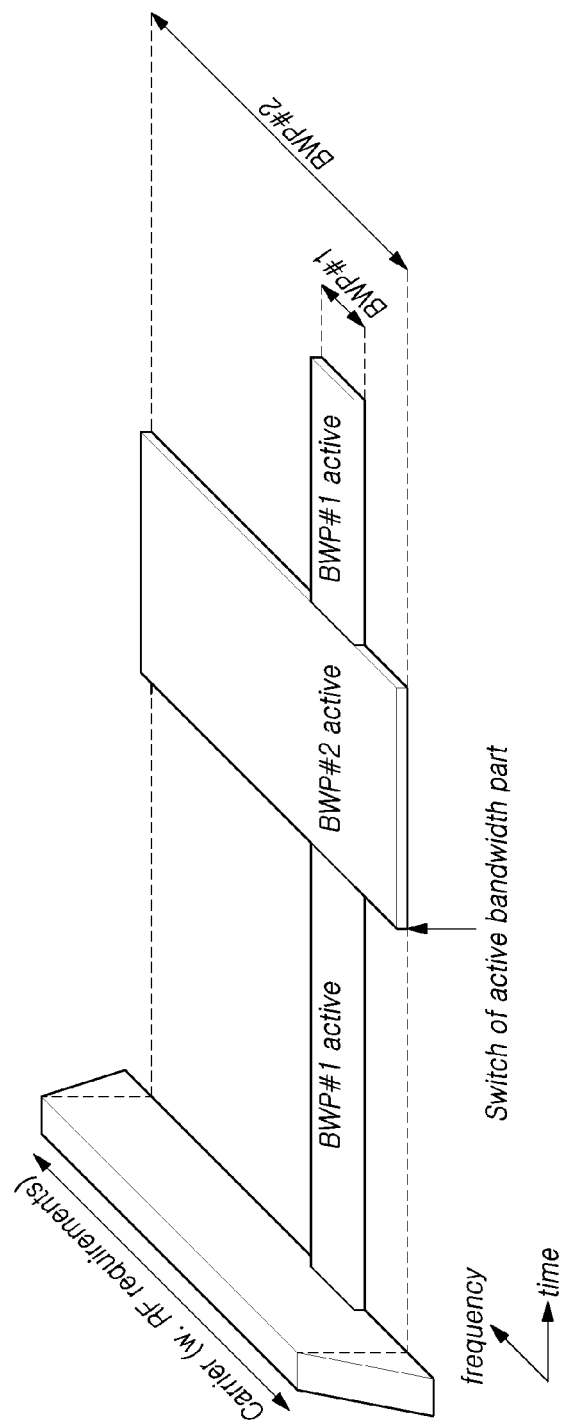
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
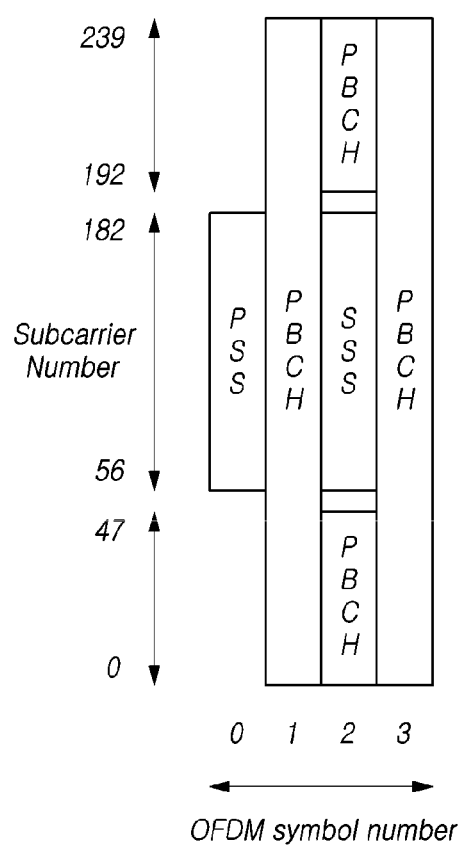
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
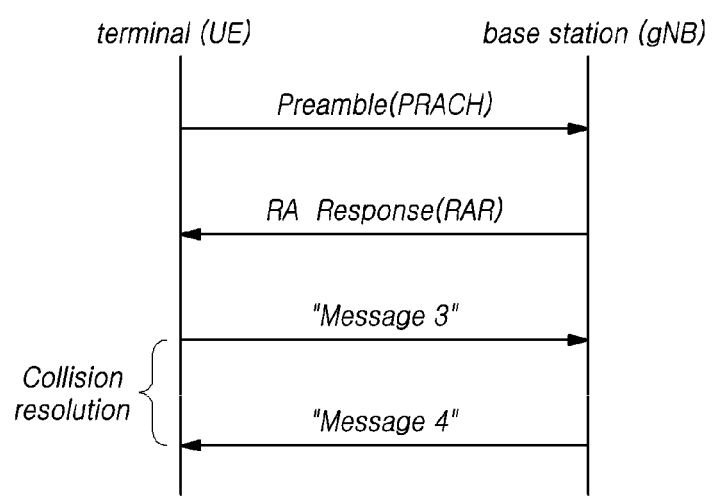
FIG. 6 is a signal diagram for explaining a random access procedure in a radio access technology in accordance with embodiments of the present disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
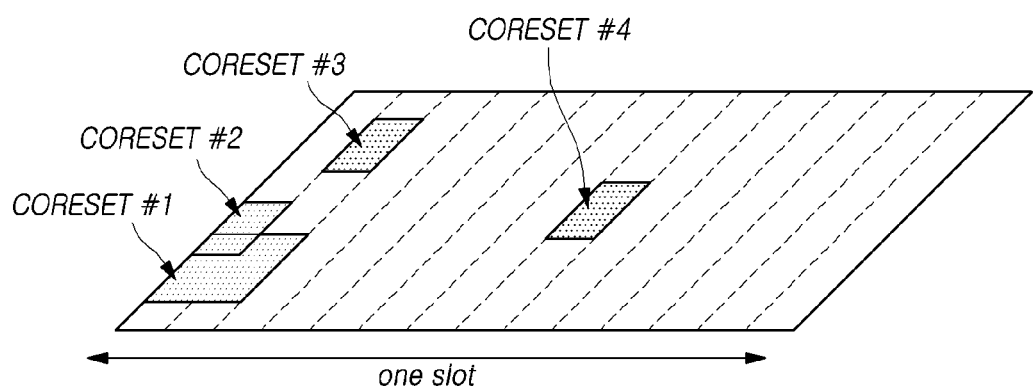
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

<LTE Sidelink>

In the LTE system, for providing device-to-device communication and vehicle-to-everything (V2X) (in particular, vehicle-to-vehicle (V2V)) service, designs for a radio channel and a radio protocol for direct communication (i.e. sidelink) between devices have been developed.

With respect to the sidelink, a synchronization signal (PSSS/SSSS) for synchronizing between a radio sidelink transmission end and a radio sidelink reception end, and a physical sidelink broadcasting channel (PSBCH) for transmitting/receiving a sidelink master information block (MIB) related to this have been defined. Further, designs have been conducted on a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

In order to assign a radio resource for the sidelink, two modes have been developed, i.e. i) mode 1 in which a base station assigns a radio resource and ii) mode 2 in which a UE selects and assigns a radio resource from a radio resource pool. Further, in order to satisfy the V2X scenario in the LTE system, a related technology has been required to be developed additionally.

In such an environment, the 3GPP have introduced 27 service scenarios related to vehicle recognition/detection in Rel-14, and determined key performance requirements according to road conditions. In addition, the 3GPP have introduced 25 service scenarios, such as vehicle platooning, advanced driving, remote driving, an extended sensor, or the like, evolved from Rel-14, and determined 6 performance requirements in Rel-15.

In order to satisfy such performance requirements, developments have been conducted for improving the performance of the sidelink technology developed based on the typical D2D communication to meet requirements of the V2X. In particular, in order to apply to the C-V2X (Cellular-V2X), a technology for improving a design of the physical layer of the sidelink to be adapted to a high-speed environment, a resource assignment technology, a synchronization technology may be selected as further study items.

The sidelink described below means a link used in D2D communication after Rel-12 of the 3GPP and V2X communication after Rel-14, and the terms for each channel, synchronization signal, and resource are described using equal terms without differently being defined according to requirements of the D2D communication, requirements of the V2X communication in Rel-14 and Rel-15. This is for convenience of description and ease of understanding, and when needed, embodiments will be described by focusing on a difference of the sidelink satisfying V2X scenario requirements relative to the sidelink for the D2D communication in Rel-12/13. Accordingly, the terms related to the sidelink discussed below are classified into D2D communication, V2X communication, and C-V2X communication for merely comparison between them and ease of understanding; therefore, such terms are not limited to a specific scenario.

<Resource Assignment>

Figure 8:
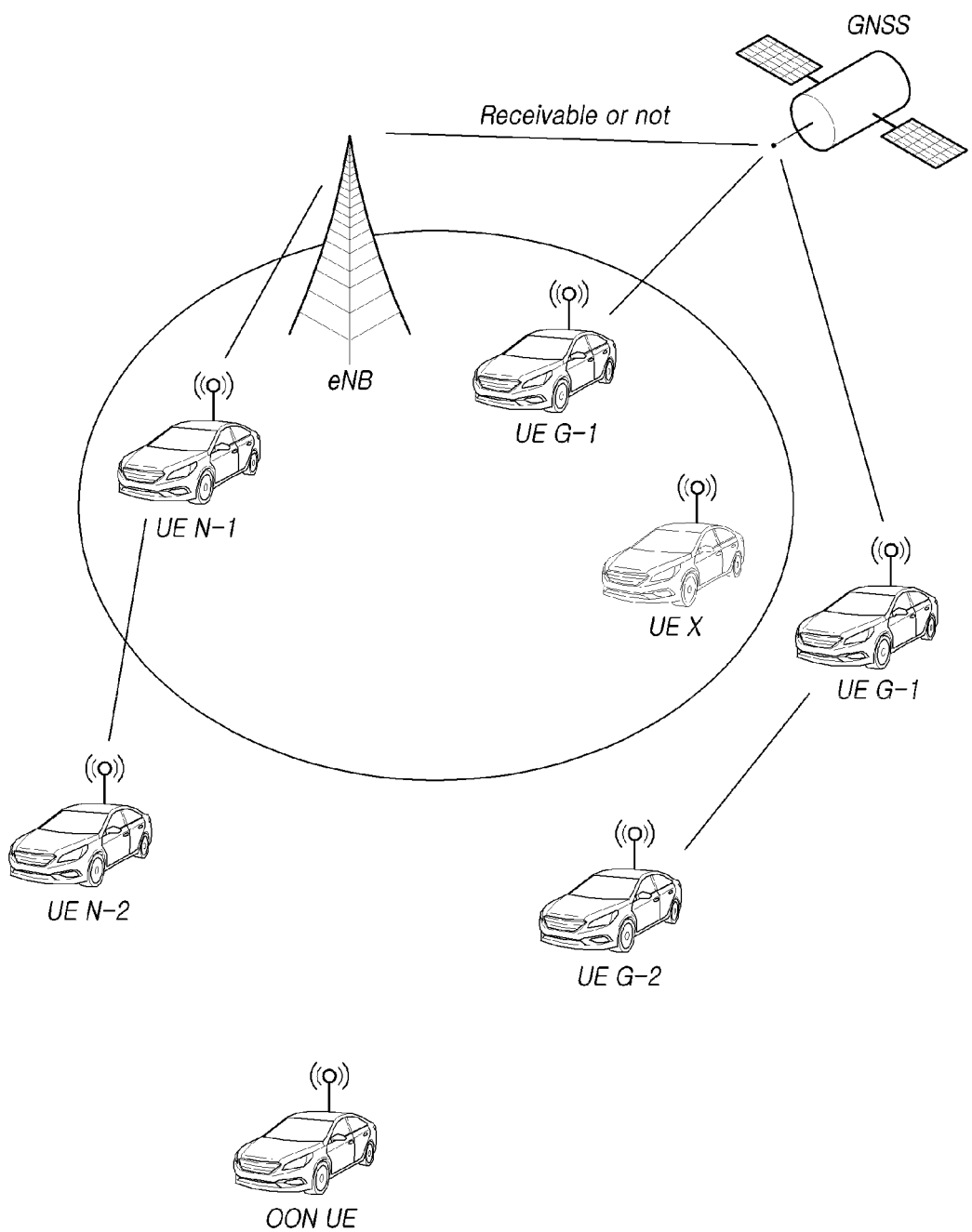
FIG. 8 is a view for explaining various scenarios for V2X communication.

FIG. 8 illustrates various scenarios for V2X communication.

Referring to FIG. 8, a V2X device (represents a vehicle; however, may be replaced with other devices, such as a user equipment (UE), etc.) may be located in coverage of a base station (e.g., an eNB, a gNB, or an ng-eNB), or located outside of coverage of the base station. For example, communication may be performed between UEs (e.g., UE N-1, UE G-1, UE X) in coverage of the base station, or communication may be performed between a UE in coverage of the base station and a UE (e.g., UE N-1, UE N-2) outside of coverage of the base station. Alternatively, communication may be performed between UEs (e.g., UE G-1, UE G-2) out of coverage of the base station.

In such various scenarios, it is necessary to assign a radio resource for enabling a corresponding UE to perform communication using the sidelink. The assignment of the radio resource includes a method of a base station for handling the assignment of the radio resource and a method of a UE on its own selects and assigns the radio resource.

Specifically, in the D2D, for enabling a UE to assign a resource, two modes are defined, that is, i) a centralized mode (mode 1) in which a base station intervenes in the selection and management of the resource, and ii) a distributed mode (mode 2) in which a UE selects randomly one or more of pre-configured resources. Similar to the D2D, other modes are defined, such as, iii) a third mode (mode 3) in which a base station intervenes in the selection and management of the resource in the C-V2X, and iv) a fourth mode (mode 4) in which a vehicle directly selects a resource in the V2X. In the third mode (mode 3), a base station provides a schedule of a scheduling assignment (SA) pool resource area and a data pool resource area assigned to this to a transmitter UE.

Figure 9A:
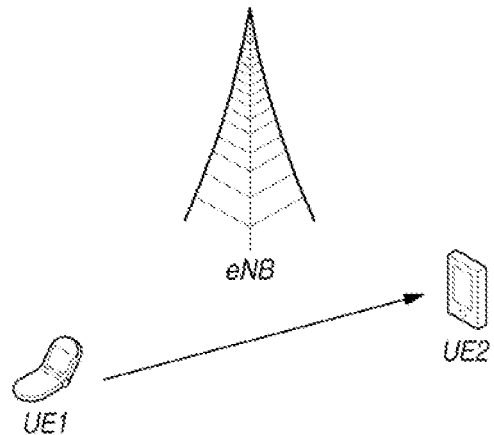
FIG. 9A is a view illustrating a first UE (UE1) and a second UE (UE2) performing sidelink communication.
Figure 9B:
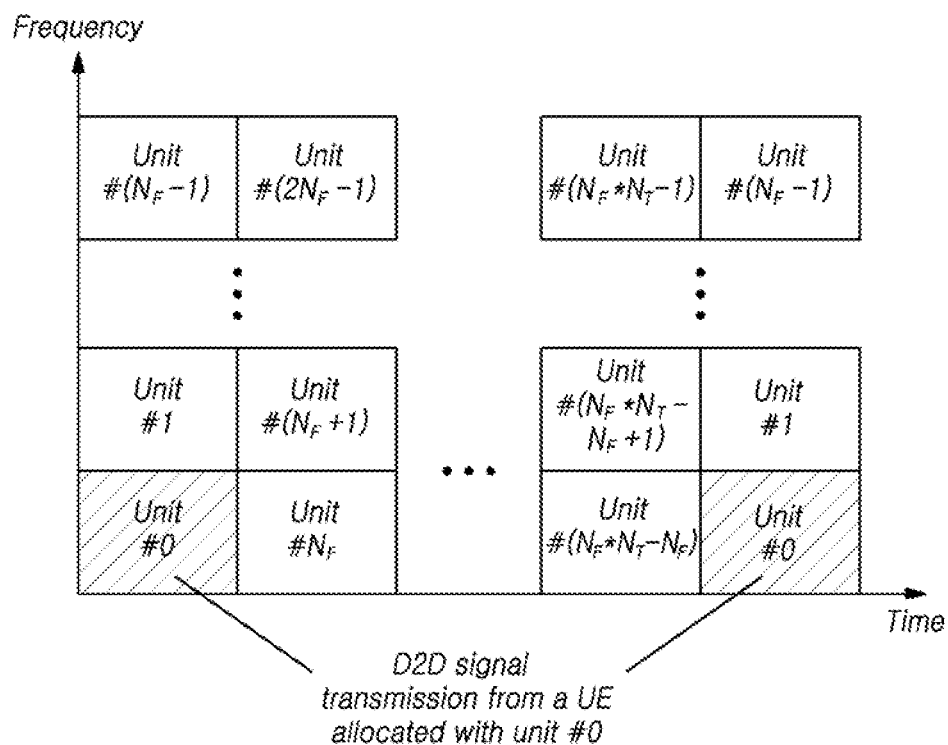
FIG. 9B is a view illustrating an example of resource pools for UEs.

FIG. 9A illustrates a first user equipment (UE1) and a second user equipment (UE2) performing sidelink communication, and FIG. 9B illustrates an example of resource pools used by the UEs.

Referring to FIG. 9, an eNB represents a base station; however, the embodiments are not limited thereto. For example, the base station may be a gNB or an ng-eNB. Further, the UEs represent mobile terminals; however, the embodiments are not limited thereto. For example, the UE may be vehicles, infrastructures, or the like may be applied variously depending on scenarios or situations.

In FIG. 9A, the transmitter UE (UE 1) may select a resource unit corresponding to a specific resource within a resource pool including a set of resources, and transmit a sidelink signal using the resource unit. The receiver UE (UE 2) may be configured with a resource pool over which the UE 1 is allowed to transmit a signal, and detect a transmission signal from the UE 1.

If the UE 1 is in coverage of the base station, that is, available to receive services or signals from the base station, the base station may provide the resource pool to the UE 1. If the UE 1 is out of coverage of the base station, that is, unavailable to receive services or signals from the base station, the resource pool may be determined as one or more resources which are pre-configured or provided by another UE. Normally, the resource pool is made up of a plurality of resource units, and each UE may select one or more resource units and use the selected resource unit(s) for transmitting a sidelink signal.

Referring to FIG. 9B, the entire frequency resource is divided into NF frequency resources, and the entire time resource is divided into NT time resources. Thus, a total of NF*NT resource units can be defined. In this case, it is possible to express that a corresponding resource pool is repeated at a period of NT sub-frames. In particular, one resource unit may be configured to be provided periodically and repeatedly, as illustrated in FIG. 9B.

The resource pool may be classified into several types according to a certain criterion. For example, the resource pool may be classified into several types according to contents of a sidelink signal transmitted over each resource pool. As one example, the contents of the sidelink signal may be classified, and a separate resource pool may be configured for each of the contents. Scheduling assignment (SA), a sidelink channel, a discovery channel, or the like may be examples of the contents of the sidelink signal.

The SA may be a signal including information, such as, a location of a resource used to transmit a subsequent sidelink data channel by a transmitter UE, a modulation and coding scheme (MCS) that is needed to demodulate a data channel, a MIMO transmission scheme, timing advance (TA), or the like. This signal may be transmitted by being multiplexed with sidelink data over an identical resource unit as well. In this case, the SA resource pool may mean a pool of resources over which the SA is transmitted by being multiplexed with the sidelink data.

An FDM scheme applied to the V2X communication may cause a time delay until a data resource is assigned after a SA resource has been assigned to be reduced. For example, it is possible to consider a non-adjacent scheme in which a control channel resource and a data channel resource are split in time domain in one sub-frame, an adjacent scheme in which a control channel and a data channel are consecutively assigned in one sub-frame, or the like.

When the sidelink data along with the SA are multiplexed and transmitted over an identical resource unit, a sidelink data channel only in a different form from SA information may be transmitted over a resource pool for the sidelink data channel. In other words, resource elements used to transmit SA information over one or more individual resource units within a SA resource pool may be used still for transmitting sidelink data in a sidelink data channel resource pool. The discovery channel may be a resource pool for a message for enabling a transmitter UE to transmit information, such as an ID of the transmitter UE, or the like, and a neighboring UE to discover the transmitter UE. Even when contents of the sidelink signal are equal, different resource pools may be used according to transmission and/or reception characteristics of the sidelink signal.

For example, in even the case of an identical sidelink data channel or a discovery message, a different resource pool may be used according to a method of determining a transmission timing of a sidelink signal (e.g., whether the sidelink signal is transmitted at the time of receiving a synchronization reference signal or transmitted by applying a certain TA from the time of receiving the synchronization reference signal) or a method of assigning a resource (e.g., whether a base station dedicates a resource for transmitting a signal to a transmitter UE or whether a transmitter UE on its own selects a resource for transmitting a signal in a pool), a signal format (e.g., the number of symbols occupied by each sidelink signal in one sub-frame, the number of sub-frames used for transmitting one sidelink signal), a signal strength of from a base station, a transmission power strength of a sidelink UE, or the like.

<Synchronization Signal>

As described above, a V2X communication UE may be located out of coverage of a base station. In even this situation, it is necessary for performing communication using the sidelink. To do this, it is important for a UE located out of coverage of the base station to achieve synchronization.

Hereinafter, a method of achieving time and frequency synchronization in sidelink communication, particularly in communication between vehicles, between a vehicle and a UE, or between a vehicle and a communication network will be described based on the description above.

The D2D communication utilizes a sidelink synchronization signal (SLSS), which is a synchronization signal transmitted from a base station for time synchronization between UEs. In the C-V2X, a satellite system (e.g., the Global Navigation Satellite System (GNSS)) may be additionally considered for enhancing synchronization performance. In this case, priority may be given to synchronization establishment or a base station may indicate information on priority. For example, when determining its transmission synchronization, a UE selects a synchronization signal directly transmitted from a base station as a highest priority, and, when the UE is out of coverage of the base station, synchronizes with the SLSS transmitted from another UE in coverage of the base station as a higher priority.

Since a wireless terminal (hereinafter, for convenience of description, may be referred to as the UE as well) installed in a vehicle, or a UE mounted in the vehicle has a less problem with battery consumption and can use a satellite signal such as the GPS for navigation purposes, the satellite signal may be used for configuring time or frequency synchronization between UEs. The satellite signal may include, as well as the Global Positioning System (GPS), the GLObal NAvigation Satellite System (GLONAS), GALILEO, BEIDOU, or the like.

The sidelink synchronization signal may include a primary sidelink synchronization signal (PSSS), a secondary sidelink synchronization signal (SSSS), or the like. The PSSS may include a Zadoff-chu sequence with a pre-configured length, a structure similar to the PSS, a structure changed from the PSS, or a structure in which the PSS is repeated. Unlike a DL PSS, a different Zadoff-chu root index (e.g. 26, 37) may be used. The SSSS may include an M-sequence, a structure similar to the SSS, a structure changed from the SSS, or a structure in which the SSS is repeated. In a situation where UEs synchronize with a base station, the SRN is served as the base station, and the SLSS is served as the PSS or the SSS.

Unlike the PSS/SSS of DL, the PSSS/SSSS uses an UL subcarrier mapping method. A physical sidelink synchronization channel (PSSCH) may be a channel for transmitting system information (e.g., information related to the SLSS, a duplex mode (DM), a TDD UL/DL configuration, information related to a resource pool, types of applications related to the SLSS, a sub-frame offset, broadcast information, or the like) which is basic information that the UE is required to identify first before transmitting/receiving a sidelink signal. The PSSCH may be transmitted over a sub-frame identical or subsequent to the SLSS. The DM-RS may be used for demodulation of the PSSCH.

The SRN may be a node for transmitting the SLSS, or the PSSCH. The SLSS may be in the form of a specific sequence, and the PSSCH may be a sequence representing specific information or in the form of a codeword after pre-defined channel coding has been performed. Here, a base station or a specific sidelink UE may be served as the SRN. A UE may be served as the SRN in the case of partial network coverage or out-of-network-coverage.

When needed, the SLSS may be relayed, for example, through multi-hop, for sidelink communication with an out-of-coverage UE. Relaying a synchronization signal in description below includes, as well as directly relaying a synchronization signal of a base station, transmitting a sidelink synchronization signal in a separate format at the time of receiving the synchronization signal. Like this, since the sidelink synchronization signal is relayed, direct communication between an in-coverage UE and an out-of-coverage UE may be performed.

<NR Sidelink>

As described above, unlike the V2X based on the LTE system, NR-based V2X technology is required to be developed for satisfying complex requirements as in autonomous driving.

In accordance with embodiments of the present disclosure, it is possible to provide a flexible V2X service in more diverse environments by applying a frame structure, numerology, a channel transmission/reception procedure, or the like of the NR to the NR V2X. To this end, it is necessary to develop technologies, such as, a resource sharing technology between a base station and a UE, a sidelink carrier aggregation technology (CA), a partial sensing technology for a UE held by a pedestrian, a short transmission time interval (sTTI), or the like.

In the NR V2X, it has been determined to support unicast or groupcast, as well as broadcast used in the LTE V2X. In this case, it also has been determined to use a target group ID for the unicast or the groupcast, and but it has been determined to discuss later whether to use a source ID.

Further, as it has been determined to support HARQ for QOS, it has been determined that a HARQ process ID is included in control information. In the LTE HARQ, a PUCCH for the HARQ is transmitted after 4 sub-frames after DL has been transmitted. In the NR HARQ, for feedback timing, a PUCCH resource and a feedback timing may be indicated using a PUCCH resource indicator in DCI format 1_0 or 1_1 PUCCH or a HARQ feedback timing indicator in response to the PDSCH (PDSCH-to-HARQ feedback timing indicator).

Figure 10:
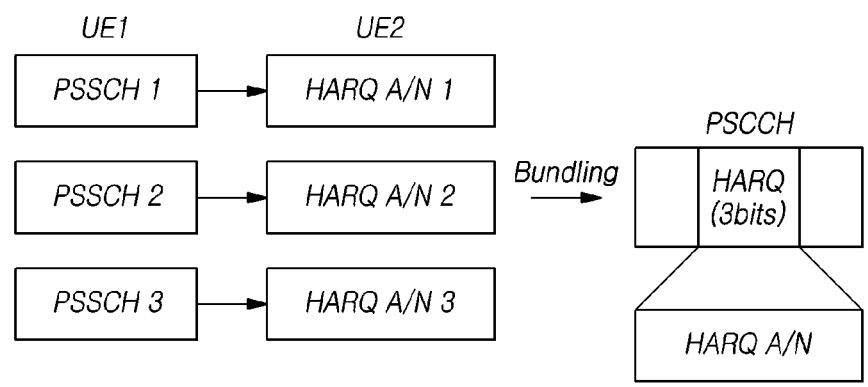
FIG. 10 is a view for explaining a method of bundling and transmitting HARQ feedback information in the V2X.

FIG. 10 illustrates a method of bundling and transmitting HARQ feedback information in the V2X.

Referring to FIG. 10, in the LTE V2X, separate HARQ ACK/NACK information is not transmitted in order to reduce system overhead, and data are allowed to be retransmitted once according to discretion of a transmitter UE for data transmission safety. However, in the NR V2X, in terms of data transmission stability, HARQ ACK/NACK information may be transmitted. In this case, overhead may be reduced by bundling and transmitting the corresponding information.

That is, when a transmitter UE (UE1) transmits three data transmissions to a receiver UE (UE2), and then the receiver UE generates HARQ ACK/NACK information in response to the transmissions, this may be bundled and transmitted over a PSCCH. FIG. 10 illustrates that HARQ ACK/NACK is transmitted over the PSCCH. However, the HARQ ACK/NACK may be transmitted over a separate channel or another channel, and the bundled HARQ information may be configured with 3 bits or less.

In frequency range 1 (FR1) for a frequency range of 3 GHz or less, 15 kHz, 30 kHz, 60 kHz, and 120 kHz have been discussed as a candidate subcarrier spacing (SCS). In frequency range 2 (FR2) for a frequency range exceeding 3 GHz, 30 kHz, 60 kHz, 120 kHz, and 240 kHz have been discussed as a candidate subcarrier spacing (SCS). In the NR V2X, a minislot (e.g., 2/4/7 symbols) smaller than 14 symbols may be supported as a unit of minimum scheduling.

The DM-RS, the PT-RS, the CSI-RS, the SRS, and the AGC training signal have been discussed as a candidate of the RS.

The following four options have been discussed for multiplexing of a PSCCH and an associated PSSCH, as illustrated in FIG. 11. Option 2 is similar to the multiplexing of the PSCCH and the PSSCH in the LTE V2X.

Synchronization Mechanism

NR V2X sidelink synchronization may include one or more sidelink synchronization signals and the PSBCH, and a sidelink source may include a UE in addition to the GNSS, and/or the gNB.

Resource Assignment

At least two sidelink resource allocation modes, i.e. mode 3 and mode 4, may be defined for NR V2X sidelink communication. In mode 3, a base station schedules one or more sidelink resources used by a UE for sidelink transmission. In mode 4, a UE determines one or more resources within one or more sidelink resources configured by a base station or one or more pre-configured sidelink resources.

Mode 4 may cover the following resource assignment sub-modes. That is, UE may automatically select a sidelink resource for transmission, help to select a sidelink resource for other UE(s), be configured with grant configured for sidelink transmission, or schedule the sidelink transmission of other UE(s).

V2X Resource Pool (Sensing and Selection Windows)

A V2X UE may transmit a message (or a channel) over a pre-defined (or signaled) resource pool. The resource pool may mean a set of one or more resources pre-defined for enabling the UE to perform the V2X operation (or in the UE capable of performing the V2X operation). In this case, the resource pool may be defined in terms of time-frequency. The V2X transmission resource pool may be defined as various types.

Figure 11A:
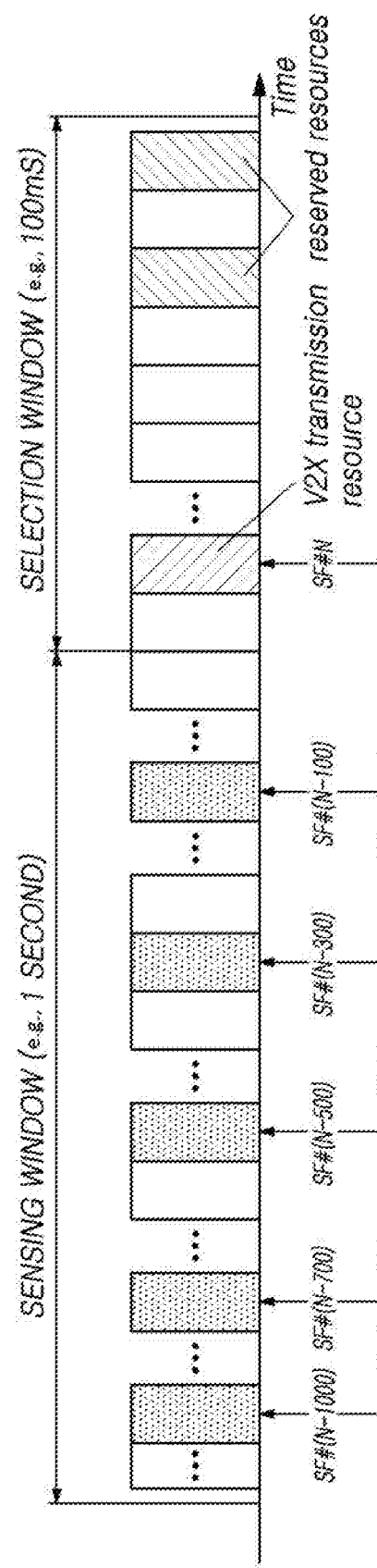
FIGS. 11A and 11B each illustrate a type of a V2X transmission resource pool.
Figure 11B:
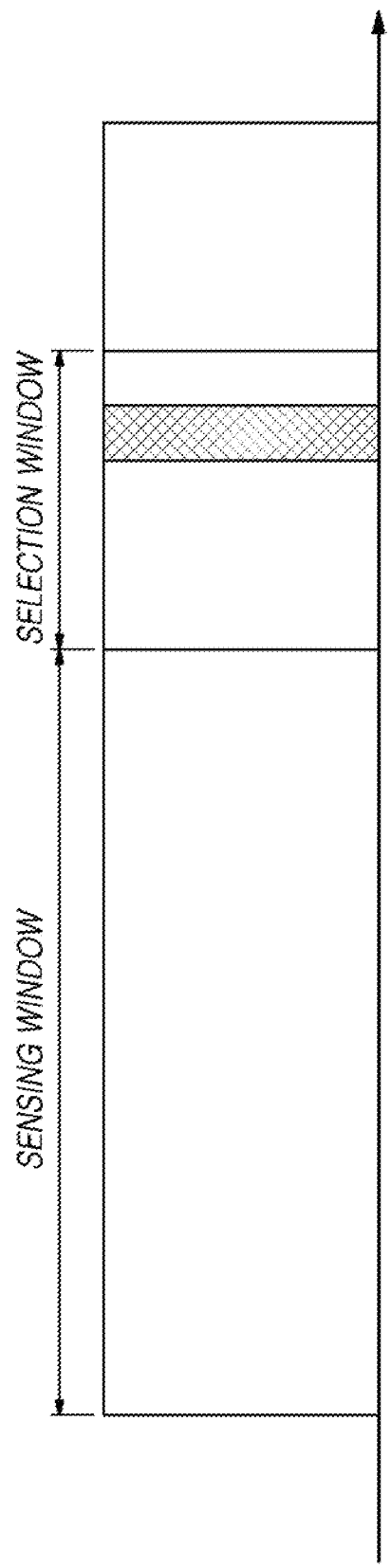

FIGS. 11A and 11B illustrate a type of a V2X transmission resource pool.

Referring to FIG. 11A, V2X transmission resource pool #A may be a resource pool over that allows partial sensing only. A V2X transmission resource selected by the partial sensing is remained semi-statically at a regular interval.

Referring to FIG. 11B, V2X transmission resource pool #A may be a resource pool over that allows a random selection only. In V2X transmit resource pool #B, a UE does not perform partial sensing, and may randomly select a V2X transmission resource in a selection window.

As one example, unlike a resource pool over which partial sensing only is allowed, in a resource pool over which the random selection only is allowed, a selected resource may be configured/signaled not to be semi-statically reserved. In order for a UE to perform a V2X message transmission operation over a V2X transmission resource pool, a base station may cause the UE not to perform a sensing operation (based on scheduling assignment decoding/energy measurement).

Although not illustrated in FIGS. 11A and 11B, a resource pool over allowing both the partial sensing and the random selection may be used as well. A base station may notify a UE that a V2X resource may be selected by either of the partial sensing and the random selection.

In this specification, a frequency, a frame, a sub-frame, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra-reliable and low-latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a sub-frame, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a sub-frame has been given as one type of a time domain structure. In addition, as a reference numerology to define a corresponding sub-frame duration, a single sub-frame duration is defined as having 14 OFDM symbols of normal CP overhead based on 15 kHz subcarrier spacing (SCS), like the LTE. Therefore, the sub-frame of the NR has the time duration of 1 ms.

Unlike the LTE, since the sub-frame of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 12:
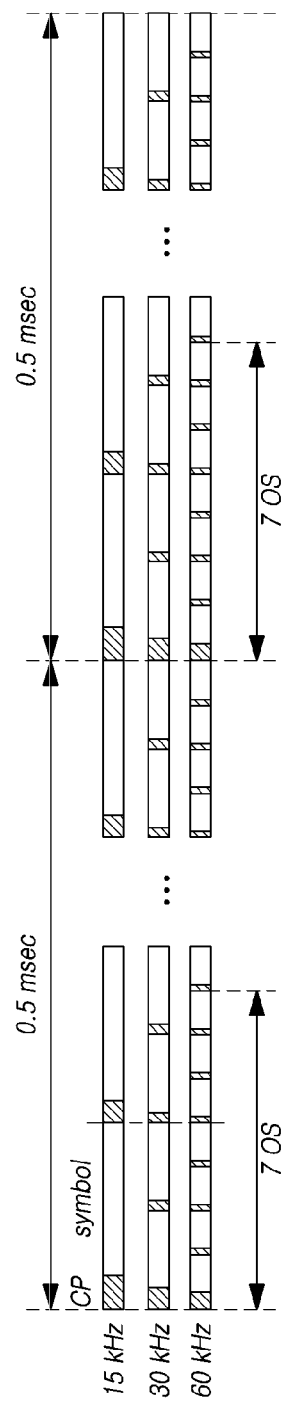
FIG. 12 is a view illustrating an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 12, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Bandwidth Part; BWP>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 13:
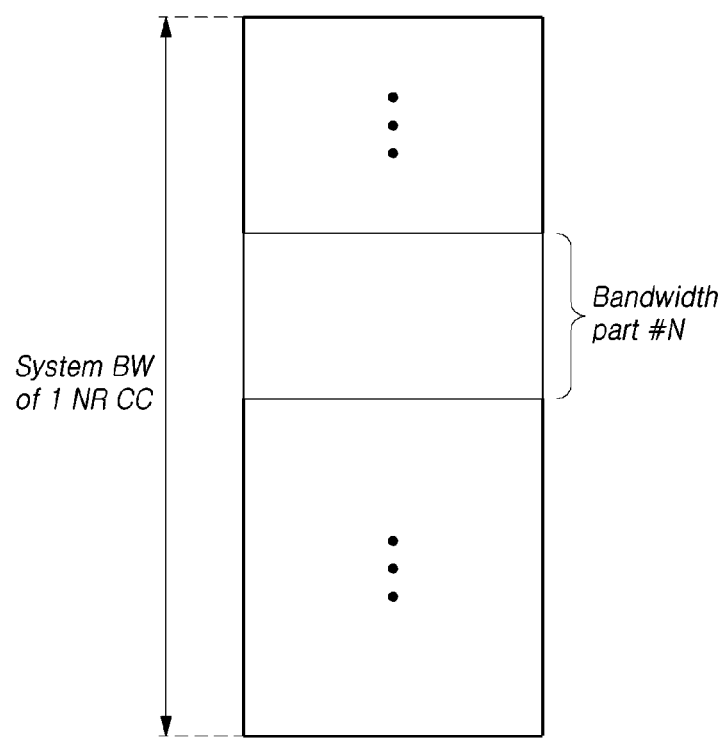
FIG. 13 is a view schematically illustrating a bandwidth part.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 13, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

<HARQ ACK/NACK Feedback Resource Allocation Method>

According to the PUCCH resource allocation method for HARQ ACK/NACK feedback of a user equipment (UE), which is defined in the NR, a base station configures a PUCCH resource set made up of one or more PUCCH resources for a UE and indicate PUCCH resource information to be used for HARQ ACK/NACK feedback for any PDSCH transmission, through an ACK Resource Indicator (ARI) information region of DCI. However, the PUCCH resource set is configured for each UL BWP configured for the corresponding UE and separate PUCCH resource sets are configured according to a payload size of HARQ ACK/NACK for any UL BWP.

In the 3GPP LTE, a sidelink transmission/reception method is standardized, as an additional feature, for supporting vehicle-to-everything (V2X) communication including device-to-device (D2D) communication, vehicle-to-vehicle (V2V) communication, which is an extension of the D2D communication, and vehicle-to-infrastructure (V2I) communication. More specifically, the D2D is a service scenario that assumes typical communication between UEs having equal relationship to each other, and the V2V is an extended device-to-device communication service scenario that assumes a wireless communication environment between vehicle terminals having different characteristics from pedestrians. In order to successfully use radio resources with or without the assistance of a base station, various technologies have been standardized in initial access and resource allocation.

In the NR, there are studies in progress for V2X related standardization for supporting the sidelink and satisfying changed service requirements, and the following four new service scenarios are assumed.

Vehicles Platooning enables vehicles to dynamically form platoons that move together. All vehicles included in a platoon acquire information from a leading vehicle to manage the platoon. This information enables vehicles i) to drive with more being adjacent to one another in a coordinated manner compared to a normal situation and ii) to move in the same direction together.

Extended Sensors enable raw or processed data collected via local sensors or live video images to be exchanged between vehicles, road site devices, pedestrian devices and V2X application servers. As a result, vehicles are able to raise environmental awareness beyond what their sensors can detect and have a broader and holistic view for a corresponding local situation. The high rate of data transmission is one of main features of this service scenario.

Advanced Driving enables semi-automatic or fully automatic driving. This service scenario enables each vehicle and/or roadside unit (RSU) to share its own perception data obtained from local sensors with nearby vehicles and vehicles to synchronize and adjust trajectories or maneuvers. Each vehicle shares a driving intention with nearby driving vehicles.

Remote Driving enables a remote driver or a V2X application to drive i) a vehicle in a hazardous environment or ii) a remote vehicle for passengers which cannot drive on its own. For example, driving based on cloud computing may be used when variations are limited and routes are predictable as in the public transportation. High reliability and low latency are main requirements of this scenario.

Meanwhile, in the NR V2X, an agreement has been tentatively reached on supporting i) Mode 1 in which a base station manages communication resources between UEs and ii) Mode 2 in which communication resources are managed by communication between UEs. In particular, in Mode 2, an agreement has been reached on the following four transmission types, and respective types have been represented as Mode 2-(a)~Mode 2-(d) or Mode 2a~Mode 2d.

Mode-2a: A UE autonomously selects sidelink resource for transmission.

Mode-2b: The UE assists sidelink resource selection for other UE(s).

Mode-2c: The UE is configured with NR configured grant (type-1 like) for sidelink transmission.

Mode-2d: The UE schedules sidelink transmissions of other UEs.

However, an agreement has been reached that the Mode-2b for transmitting subsequent channel configuration assistant information is defined as additional functions of the other three modes, and therefore, it will not be operated any longer as a single mode.

In the case of the LTE, a mode in which a base station manages communication resources between UEs is classified into Mode 1 and Mode 3, and a mode in which a UE manages communication resources at its discretion is classified into Mode 2 and Mode 4. A sidelink transmission procedure according to LTE Mode 1 is as follows.

1) A base station configures a resource pool for the transmission of a physical sidelink control channel (PSCCH) for all UEs. The resource pool is divided based on a unit of a region formed of two sub-frames and a bandwidth of 1RB (1×4=4 RBs in total), and then an index formed of 6 bits is allocated to each region. At this time, the index is allocated to only the upper half band of the resource pool, and all sidelink UEs repeatedly transmit identical sidelink control information (SCI) on an identical location of the lower half band thereof (8 RBs in total).

2) When a UE transmits a scheduling request (SR) to a base station over a physical uplink control channel (PUCCH), the base station transmits a PSCCH index of 6 bits and time/frequency resource information of the data region using downlink control information (DCI) Format 5 over a physical downlink control channel (PDCCH).

3) The UE transmits an SCI format 0 message through a PSCCH resource indicated by the 6 bits based on the received information. At this time, information received through the DCI Format 5 is used for the data region resource in the message. The UE encodes data to be sent using an MCS value that is pre-configured through RRC or selected by the UE itself, maps the encoded data to the corresponding data region resource, and then transmits the mapped data.

4) Other UEs continue to search the inside of the resource pool for PSCCH transmission. When a desired PSCCH transmitted from a user is detected, the other UEs perform sidelink reception by detecting a data region resource location, an MCS, or the like based on a corresponding SCI message.

A sidelink transmission procedure according to LTE Mode 2 is as follows.

1) A base station configures a resource pool for PSCCH transmission in Mode 2 for all UEs. A structure of the corresponding pool is identical to that configured in Mode 1.

2) A UE checks whether a specific PSCCH resource region is used through sensing. When the specific PSCCH resource region is empty, through the sensing, the UE transmits an SCI format 0 message indicating the empty PSCCH resource region. At this time, the data region resource inside of the message is configured as a resource region configured at its own discretion. Further, the UE encodes data to be sent using an MCS value that is selected by the UE itself, maps the encoded data to the corresponding data region resource, and then transmits the mapped data.

3) A procedure of other UEs for performing corresponding region reception is identical to that of Mode 1.

A sidelink transmission procedure according to LTE Mode 3 is as follows.

1) A base station configures a resource pool for PSCCH transmission for all UEs. At this time, the corresponding PSCCH may be configured to be adjacent to a PSSCH indicated by the PSCCH or configured independently. In the case of being independently configured, the configuration of the resource pool for PSCCH transmission is similar to that of Mode 1. However, in this case, the corresponding resource pool is divided into regions of one sub-frame and two consecutive BRs (2×2=4 RBs in total), and an index formed of k bits is allocated to each region, wherein the k depends on a band size of the configured resource pool. When the PSCCH and the PSSCH indicated by the PSCCH are configured to be adjacent to each other, the band of the configured resource pool is divided, in the frequency domain, into sub-channels each having a size of at least 4 pre-configured RBs, and an index formed of k bits is allocated to the two lowest RBs of each sub-channel as a PSCCH transmission candidate region (2×2=4 RBs in total) wherein the k depends on the band of the configured resource pool, that is, the number of sub-channels. In the case of Mode 3, SCI is not transmitted repeatedly.

2) When a UE transmits a scheduling request (SR) to a base station over a PUCCH, the base station transmits a PSCCH index of k bits and time/frequency resource information of the data region using DCI Format 5 over a PDCCH.

3) The UE transmits an SCI format 1 message through a PSCCH resource indicated by the k bits based on the received information. At this time, information received by the DCI Format 5A is used for the data region resource in the message. Thereafter, the UE maps data to be sent to a corresponding data region resource and transmits the mapped data.

4) A subsequent procedure is identical to that in Mode 1.

A sidelink transmission procedure according to LTE Mode 4 has basically the same resource pool form as Mode 3, and a transmission scheme therein is the same as that in Mode 2. However, a message for reserving a resource by configuring a specific time-domain resource and a priority message for managing QoS are additionally included in SCI.

Meanwhile, in the case of NR-based V2X, there has arisen a necessity of supporting sidelink transmission/reception based on the unicast or the groupcast, as well as the broadcast. Like this, when it is desirable to define sidelink transmission and/or reception methods based on the unicast or the groupcast as one type of NR-based V2X communication, it is necessary to define a method of applying HARQ for a corresponding sidelink radio channel. A HARQ ACK/NACK message for a specific message may be transmitted over a physical sidelink feedback channel (PSFCH). In this case, one or more last symbol(s) of a slot may be used on a location of the corresponding PSFCH. In this form, a PSFCH region may be defined for every N slots for N no less than 1, and at least one N greater than 1 may be supported.

Then, in relation to the standard of the sidelink synchronization signal, the sidelink SS/PSBCH block (S-SSB) including the sidelink synchronization signals SPSS and SSSS and its accompanying PSBCH may have 11RB in a frequency domain, 1st to 13th symbols in one slot in a time domain, and a period of 160 ms in all subcarrier spacing (SCS) environments, in a physical channel. At this juncture, how many S-SSBs at the maximum can be transmitted in one period may differ depending on the SCS environment, and each case is as follows.

For FR1:
In case of 15 kHz SCS, {1, 2}
In case of 30 kHz SCS, {1, 2, 4}
In case of 60 kHz SCS, {1, 2, 4, 8}
For FR2:
In case of 60 kHz SCS, {1, 2, 4, 8, 16, 32}
In case of 120 kHz SCS, {1, 2, 4, 8, 16, 32, 64}

Generally, it is assumed that the physical channel location and timing-related information transmitting this S-SSB is known to the UEs that perform the sidelink transmission/reception using a corresponding carrier. As described above, in the physical channel, not more than about 1% of slots in FR1 and not more than about 5% of the slots in FR 2 may be used for transmission of the S-SSB.

On the other hand, unlike the existing LTE V2X, the NR supports unicast and groupcast transmission types, and thus supports Hybrid ARQ. Then, as is in the case of Mode 2, in order to prevent PSFCH resource collision between other users in an environment where the user can select a resource for itself to make transmission/reception on the basis of its sensing, the location of the feedback resource PSFCH related to data transmitted through specific PSCCH and PSSCH may be determined in a form determined depending on position information of the corresponding PSCCH and PSSCH and so on. At this time, the S-SSB region and the PSCCH, PSSCH and PSFCH regions determined by the resource pool setting may overlap each other, wherein transmission of the PSCCH and PSSCH can be avoided because the region to which the S-SSB is to be transmitted is known in advance. However, there is no guarantee that the PSFCH region can be determined beforehand to be avoided using such format, which region is to be determined depending on the location information of the PSCCH and PSSCH a few slots ahead, and thus collision may occur. Therefore, according to the existing process, the S-SSB and PSFCH signals may interfere with each other following collision of their regions, thereby deteriorating the quality of each signal.

Thus, according to the present disclosure, there is provided a method for appropriate feedback procedure in case where a PSFCH region and an S-SSB region collide in an NR sidelink transmission/reception environment. In particular, there are provided a method for operating a retransmission procedure when any PSFCH transmission cannot be performed in the corresponding environment and a method for determining an alternative PSFCH to enable the PSFCH transmission.

Hereinafter, a method of transmitting and receiving HARQ feedback information for sidelink transmission will be described in more detail with reference to the accompanying drawings.

Throughout the present disclosure, a transmitter UE (Tx UE) may refer to a UE that is adapted to transmit a PSCCH and a corresponding PSSCH to a receiver UE through a sidelink. The transmitter UE (Tx UE) may be also referred to as 'another UE'. Further, a receiver UE (Rx UE) may refer to a UE that is adapted to receive the PSCCH and the corresponding PSSCH from the transmitter UE through the sidelink. The receiver UE (Rx UE) may be also referred to as 'a UE'.

Figure 14:
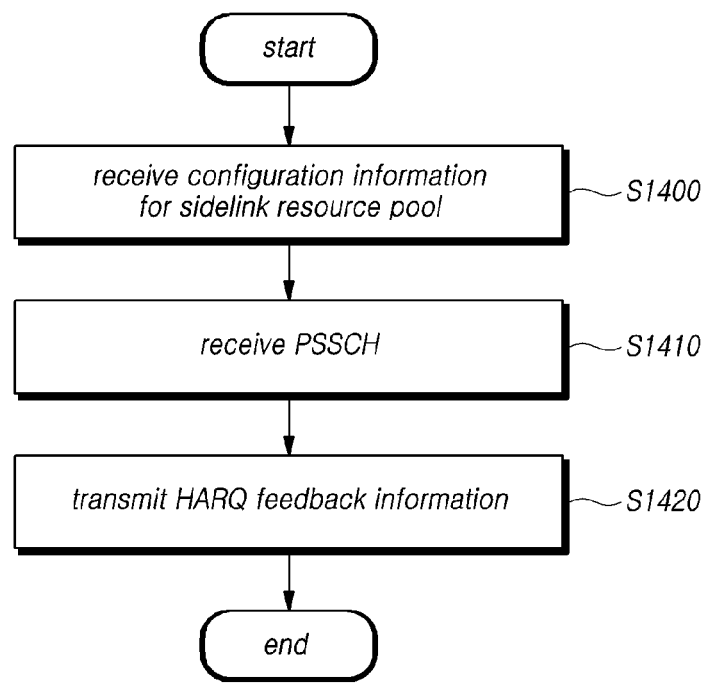
FIG. 14 is a view illustrating a procedure of a user equipment for transmitting HARQ feedback information for sidelink transmission according to an embodiment.

FIG. 14 is a flowchart diagram illustrating a procedure of a UE for transmitting HARQ feedback information for sidelink transmission according to an embodiment.

Referring now to FIG. 14, the UE may receive configuration information on a sidelink resource pool for the sidelink transmission from the base station (S1400).

The base station may configure the sidelink resource pool in radio resources for sidelink transmission/reception between a UE and another UE. Here, the sidelink resource pool may be a radio resource configured to be used to transmit and receive PSCCH, PSSCH, PSFCH, and the like between a UE and another UE. The UE may be configured to receive configuration information about the sidelink resource pool from the base station through higher layer signaling.

The sidelink resource pool may be made up of a predetermined number of consecutive sub-channels. Further, each sub-channel may have a predetermined number of consecutive physical resource blocks (PRBs). The configuration information for the sidelink resource pool may include information on the number of consecutive PRBs and the number of the consecutive sub-channels, which may be respectively indicated by higher layer signaling.

According to an example, transmission of the HARQ feedback information through the PSFCH resource may be carried out based on timing gap information between reception of PSSCH and transmission of the HARQ feedback information for the reception of PSSCH, in the sidelink resource pool. Accordingly, the PSFCH region determined depending on the position of the PSSCH region may be often set to overlap the S-SSB region for synchronization.

Thus, in order to prevent the S-SSB region and the PSFCH region from colliding with each other, the sidelink resource pool may be configured excluding resources allocated to the S-SSB region. In other words, the physical channel slot transmitting the S-SSB may be excluded from the logical channel in relation to the configuration of the sidelink resource pool. Accordingly, the sidelink resource pool may be configured to include a set of slots excluding slots in which a sidelink SS/PSBCH block (S-SSB) is configured.

In this case, the set of slots included in the sidelink resource pool may be expressed based on sub-carrier spacing applied to the sidelink bandwidth part (SL BWP) in which the sidelink resource pool is configured.

Accordingly, while the transmitter UE and the receiver UE each transmit/receive S-SSB through a physical channel, the entire slot used for transmitting and receiving S-SSB may be made not included in the logical channel in the sidelink resource pool used for sidelink transmission. Hence, the transmitter UE and the receiver UE can perform PSFCH transmission/reception without any collision with transmission of the S-SSB.

According to an example, the base station is described hereinafter on the premise of the mode 2 that it may configure a resource pool for a sidelink, and the radio resources may be managed by means of communications between UEs, but unless contrary to the technical idea disclosed herein, the same can be applied substantially even in the scheme based on the mode 1 that the base station performs scheduling for the sidelink transmission.

Referring back to FIG. 14, the UE may receive a sidelink data channel (Physical Sidelink Shared Channel; PSSCH) from another UE through the resource allocated in the sidelink resource pool (S1410), and HARQ feedback information for reception of PSSCH may be transmitted through PSFCH resource allocated in the sidelink resource pool (S1420).

When PSSCH is received by a UE, the UE may be configured to transmit HARQ ACK/NACK feedback information corresponding to the received PSSCH to the UE that transmitted the PSSCH. For use in transmission of the HARQ ACK/NACK feedback information, the UE may further receive configuration information for PSFCH resources.

According to an example, PSFCH resources that can be used when transmitting the PSFCH may be included in a sidelink resource pool configured in between a UE and another UE. In this case, in addition to the PSCCH region and the PSSCH region, a PSFCH region may exist in the sidelink resource pool. In particular, the UE may receive configuration information on PSFCH resource that the PSFCH can be transmitted in the resource pool.

According to one example, the PSFCH resource may be configured of a set of physical resource blocks (PRBs) in a resource pool for the sidelink transmission. In this case, the configuration information on a frequency resource for PSFCH transmission may be received by means of higher layer signaling.

Typically, the PSFCH is required to correspond to each of one transport block, and thus it is not necessary to set a transmission zone for every RB. In other words, at the time of initial transmission, the PSFCH may be set to be transmitted only at a position corresponding to one PSCCH transmission region, and then, a UE performing transmission through the remaining slots in which the corresponding region exists may perform transmission while keeping the corresponding region empty. In this case, the symbol length of the PSFCH may be set through RRC information other than an initial resource pool resource configuration, through which resource allocation of the resource pool may be determined.

When the UE receives a PSSCH, it may configure HARQ ACK/NACK feedback information corresponding to the received PSSCH. For example, whether HARQ feedback information is transmitted or not may be indicated by sidelink control information (SCI) including scheduling information for PSSCH. In other words, information indicating HARQ feedback information may be transmitted together in the SCI including resource allocation information for PSSCH transmission.

Based on the number of sub-channels for the resource pool and the number of PSSCH slots associated with the PSFCH slot, the UE may determine one or more PRBs for a PSFCH used to transmit HARQ feedback information among a set of PRBs by configuration information for frequency resources in the resource pool. In addition, the UE may determine the number of PSFCH resources used to transmit the HARQ feedback information.

Further, transmission of the HARQ feedback information may be performed based on timing gap information between reception of PSSCH, being received through higher layer signaling, and transmission of HARQ feedback information for the reception of PSSCH. In this case, for example, PSFCH transmission may be performed in a first slot including a PSFCH resource in a resource pool subsequent to the last slot of PSSCH reception.

In other words, the UE may transmit the HARQ ACK/NACK feedback information for the received PSSCH, without any collision with the S-SSB, using the PSFCH resource determined from the sidelink resource pool.

Accordingly, there may be provided a method and apparatus capable of preventing collision with a sidelink SS/PSBCH block (S-SSB) that may occur in transmitting the HARQ feedback information for reception of a sidelink data channel in the NR.

Figure 15:
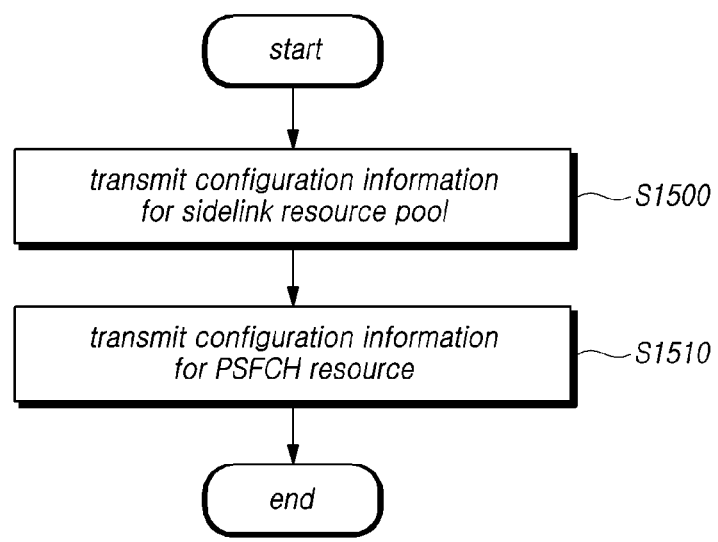
FIG. 15 is a view illustrating a procedure of a base station for controlling transmission of HARQ feedback information for sidelink transmission of a UE according to an embodiment.

FIG. 15 is a flowchart diagram illustrating a procedure of a base station for controlling transmission of HARQ feedback information for sidelink transmission of a UE according to an embodiment.

Referring to FIG. 15, the base station may transmit configuration information on a sidelink resource pool for sidelink transmission (S1500).

The base station may configure a resource pool on radio resources for sidelink transmission/reception between a UE and another UE. Here, the resource pool may be of a radio resource configured to be used to transmit/receive PSCCH, PSSCH, and so on between the UE and other UE. The base station may transmit configuration information on the resource pool to the UE through higher layer signaling.

The base station may configure the sidelink resource pool with a predetermined number of consecutive sub-channels. In addition, each sub-channel may have a predetermined number of consecutive physical resource blocks (PRBs). The configuration information for the sidelink resource pool may include information on the number of consecutive PRBs and the number of consecutive sub-channels, which may be respectively indicated to the UE by higher layer signaling.

For example, transmission of the HARQ feedback information through a PSFCH resource may be performed based on timing gap information between reception of a PSSCH and transmission of the HARQ feedback information for the reception of PSSCH, in the sidelink resource pool. Accordingly, the PSFCH region determined depending on the position of the PSSCH region may be often set to overlap the S-SSB region for synchronization.

In order to prevent the S-SSB region and the PSFCH region from colliding with each other, the sidelink resource pool may be configured excluding resources allocated to the S-SSB region. In other words, the physical channel slot in which the S-SSB is transmitted may be excluded from the logical channel in relation to the configuration of the sidelink resource pool. Accordingly, the sidelink resource pool may be configured to include a set of slots excluding slots in which a sidelink SS/PSBCH block (S-SSB) is configured.

In this context, the set of slots included in the sidelink resource pool may be expressed based on subcarrier spacing applied to the sidelink bandwidth part (SL BWP) in which the sidelink resource pool is configured.

Accordingly, while the transmitter UE and the receiver UE transmit/receive the S-SSB through a physical channel, the entire slot used for transmitting and receiving the S-SSB may be made not included in the logical channel in the sidelink resource pool used for the sidelink transmission. Hence, the transmitter UE and the receiver UE may perform PSFCH transmission/reception without any collision with transmission of the S-SSB.

Referring back to FIG. 15, the base station may transmit configuration information on PSFCH resources for transmission of a physical sidelink feedback channel (PSFCH) in the resource pool (S1510).

When the UE receives PSSCH, the UE may be set to transmit the HARQ ACK/NACK feedback information corresponding to the received PSSCH to other UE that has transmitted the PSSCH. For use in transmission of the HARQ ACK/NACK feedback information, the base station may transmit configuration information on the PSFCH resource to the UE.

For example, the PSFCH resource that can be used when transmitting PSFCH may be indicated in a resource pool for the sidelink transmission configured between a UE and another UE. In this case, in addition to the PSCCH region and the PSSCH region, a PSFCH region may exist in the resource pool. In particular, the base station may transmit, to the UE, configuration information on a frequency resource in which the PSFCH can be transmitted in the resource pool.

For example, the frequency resource for PSFCH transmission may be configured as a set of PRBs in a resource pool for the sidelink transmission, in which case the configuration information on frequency resources for transmission of the PSFCH may be transmitted via higher layer signaling.

As the PSFCH is generally required to correspond to each transport block, it will be not necessary to set a transmission zone for every RB. In other words, at the time of initial transmission, the PSFCH may be set to be only transmitted to a location corresponding to one PSCCH transmission region, and the UE performing transmission through the remaining slots in which the corresponding region exists may perform transmission with the corresponding region kept empty. In this case, the symbol length of the PSFCH may be set through RRC information other than the initial resource pool resource configuration, through which resource allocation of the resource pool may be determined.

The UE may transmit the HARQ feedback information on the PSSCH received from other UE, through the PSFCH resource determined based on the configuration information on the frequency resource in the resource pool. When the UE receives PSSCH, the UE may configure the HARQ ACK/NACK feedback information corresponding to the received PSSCH. According to an example, whether to transmit the HARQ feedback information may be indicated by SCI including scheduling information for PSSCH. Thus, information indicating the HARQ feedback information may be transmitted together in the SCI including resource allocation information for the PSSCH transmission.

Based on the number of sub-channels for the resource pool and the number of PSSCH slots associated with the PSFCH slot, the UE may determine one or more PRBs for PSFCH used to transmit the HARQ feedback information among a set of PRBs based on configuration information for frequency resources in the resource pool. In addition, the UE may determine the number of PSFCH resources used to transmit the HARQ feedback information.

Further, transmission of the HARQ feedback information may be performed based on timing gap information between reception of PSSCH, being received through higher layer signaling, and transmission of the HARQ feedback information for the reception of PSSCH. In this case, for example, PSFCH transmission may be performed in a first slot including a PSFCH resource in a resource pool subsequent to the last slot of PSSCH reception.

That is to say, the UE may transmit the HARQ ACK/NACK feedback information for the received PSSCH, without any collision with the S-SSB by using the PSFCH resource determined from the sidelink resource pool.

Accordingly, there are provided a method and apparatus for preventing collision with a sidelink SS/PSBCH block (S-SSB) that may occur when transmitting the HARQ feedback information for reception of a sidelink data channel in the NR.

Hereinafter, respective embodiments associated with the configuration and allocation of radio resources for transmitting the HARQ feedback information for sidelink transmission in the NR will be described in detail referring to the related drawings.

In the present disclosure, there is provided a method for an appropriate feedback procedure when a PSFCH region and an S-SSB region collide in an NR sidelink transmission/reception environment. In particular, there are provided a method for operating a retransmission procedure when PSFCH transmission cannot be performed in a corresponding environment and a method for determining an alternative PSFCH for enabling PSFCH transmission.

The present disclosure generally provides (1) a method of preventing a PSFCH collision in advance, (2) a method of operating a retransmission procedure when the PSFCH is not available, and (3) a method of determining an alternative PSFCH. Prior to describing the inventive operation according to the present disclosure, some terms used throughout the disclosure are defined. In the present disclosure, it will be appreciated that terms used to describe a certain element may be used later with other terms having the same or like meaning, and are intended to describe the role of a certain actual object, and the scope of the technology is not limited by those terms.

Throughout the present disclosure, a scheduling UE (S-UE) is intended to mean a UE that may manage sidelink transmission resources between UEs managed by itself, allocate a transmission resource to be allocated to each link, in a time/frequency resource set in advance by a base station or the like, based on SR received from each UE or information received from an upper layer, and deliver it to a transmitter UE of the corresponding link.

Further, a scheduling indication message may refer to a message transmitted by the base station or the scheduling UE in the form of DCI/SCI, including time/frequency location information of a data region to be used by the transmitter UE.

In addition, a sidelink control message may refer to a message that the transmitter UE transmits to the receiver UE, including the time/frequency and MCS information of the data region.

Embodiment 1: Prevention of PSFCH Collision in Advance

This embodiment is directed to a method for simultaneously transmitting the S-SSB and the PSFCH not to deteriorate their respective performance. First of all, in the transmitter UE and the receiver UE, the sidelink transmission in which a region to be allocated for PSFCH transmission is transmitted through the PSCCH/PSSCH overlapping all or part of the known S-SSB region may be defined to be only either broadcast or unicast/groupcast without HARQ (or not using HARQ). In other words, the unicast/groupcast set to use HARQ does not select and transmit the corresponding PSCCH/PSSCH. By means of the method, the problem of the retransmission procedure due to non-usable PSFCH can be solved in advance.

Secondly, when the S-SSB region and the PSFCH transmission region entirely or partially overlap, the receiver UE may not perform the PSFCH transmission regardless of whether feedback is preset in the resource pool. This has the effect of not deteriorating the quality by interfering with the S-SSB.

Thirdly, the transmitter UE may determine that the feedback message is not transmitted/has not been transmitted in the PSFCH that overlaps all or part of the S-SSB. This also has the effect of not deteriorating the transmission performance by misunderstanding the signal of the S-SSB as a PSFCH.

Fourthly, the physical channel slot for transmitting the S-SSB may be excluded from the logical channel regardless of whether a resource pool is preset. That is, while the UE physically transmits and receives the S-SSB, the entire slot used for transmitting and receiving the S-SSB may not be included into the logical channel, for the resource pool used for the sidelink transmission. Although it makes the frequency domain excluding the S-SSB more or less waste, the UE can perform the PSFCH transmission/reception without any collision while utilizing most of the existing process to the maximum.

The four solutions according to the above-described first embodiment may be respectively operated simultaneously with each other, or may be selectively operated as necessary.

Embodiment 2: Operation of Retransmission Procedure when PSFCH is Unavailable This embodiment is directed to a method for enabling a transmitter UE to perform a procedure under an environment where it is expected to receive no PSFCH feedback from the receiver UE, due to the region is overlapped with the S-SSB because the PSFCH is mapped according to the typical method. For example, the transmitter UE is assumed to be in the environment in which the PSFCH feedback has not been actually received, and the transmitter UE is able to determine in advance that the reason for failure of receiving the feedback is not because of a general cause such as, for example, poor reception status or a case in which in the case of ACK, it is promised not to send the feedback, but because of the cause that the feedback is not made due to the high-priority transmission of S-SSB. In this case, there are proposed a method of fixing the unusable PSFCH feedback to a specific value, and a method of performing retransmission in a form capable of receiving feedback regardless of the feedback. The detailed procedure for each method is described as follows.

① Fixing Unusable PSFCH Feedback to a Specific Value

This method collectively fixes a PSFCH feedback message that has not been transmitted, to ACK or NACK.

Specifically, when it is configured to transmit only NACK as feedback (i.e., NACK only Feedback) in an environment such as a groupcast, the receiver UE does not perform feedback transmission for the ACK. Therefore, when no feedback information is received, the transmitter UE may determine it as ACK However, when the corresponding PSFCH feedback region collides with the S-SSB, the transmitter UE may determine it as NACK even if there is no feedback received value.

Further, in case of the unicast or the groupcast set with performing ACK/NACK feedback, the transmitter UE may determine it as NACK when there is no feedback received value. However, when the corresponding PSFCH feedback region collides with the S-SSB, the transmitter UE may determine it as ACK even if there is no feedback received value. In case of failure of the transmission, the transmitter UE may retransmit the lost packet through a higher level of ARQ process. The latter method may be applied in the form of assuming ACK, or may be applied in the form of dynamically disabling the HARQ process even if it is preset to use HARQ only for the corresponding transmission.

② Performing Automatic Retransmission in Association with Unusable PSFCH

This method processes the feedback of the corresponding transmission by using blind retransmission in which the retransmission is performed without waiting for ACK/NACK feedback. In particular, when the use of blind retransmission is transmitted to the receiver UE through SCI or the like, each UE may be adapted to transmit/receive ACK/NACK to every transport block for reasons of e.g., CQI determination or the like, or transmit/receive ACK/NACK to only the last block for reasons of efficiency and so on. Among these, when a certain feedback transmission/reception PSFCH overlaps the S-SSB, the receiver UE may ignore the preset ACK/NACK configuration and transmit ACK/NACK feedback information only for possible blocks.

As an example, when the last retransmission-related PSFCH transmission is not possible, and the reception is successful only with the previous transmission, the receiver UE may transmit ACK through the previous transmission-related feedback resource region so that no further retransmission can occur, even though it was set in advance to transmit the feedback information only to the last retransmission.

As a second method, when transmission occurs in a region where PSFCH cannot be used even if there is no other pre-blind retransmission setting, the transmitter UE may automatically perform blind retransmission at a predetermined specific location. In this circumstance, the receiver UE may transmit the feedback message through the PSFCH connected to the corresponding retransmitted region. For example, in the corresponding case, the transmitter UE may perform retransmission using an immediately next slot, and similarly, the receiver UE may transmit the feedback message through the PSFCH of the immediately next slot of the S-SSB slot in which the collision occurred.

Embodiment 3: Determination of Alternative PSFCH

This embodiment is directed to a method for designating beforehand an alternative resource to be used, when it is predicted that the PSFCH feedback could not be received from the receiver UE, due to possible overlapping with the S-SSB region by mapping the PSFCH according to the conventional method. This embodiment may be briefly divided into two methods, namely, a first method of moving the PSFCH location on a frequency and then a second method of moving the same on a time axis, wherein each method may be selectively applied according to the environments concerned. For example, when there is not enough space to move the PSFCH location on the frequency, it may be implemented in a scheme to move it on the time axis. This determination may be made based on the number of RBs in the resource pool, the number of available PSCCHs per slot, and the number of RBs that overlap/do not overlap the S-SSB.

① Movement of PSFCH Location on Frequency

This method sets the PSFCH frequency region to be used so as not to be overlapped when the frequency band occupied by the resource pool region overlaps the frequency band of the S-SSB. This may be applied either in the form of adjusting the frequency interval between frequency division multiplexed (FDMed) PSFCHs or in the form of adjusting the bandwidth of the PSFCH. In particular, when the PSFCH bandwidth is adjusted, the number of PSFCH symbols may be adjusted accordingly. Such adjustment may be performed collectively in the entire resource pool in which the S-SSB and the transmission region overlap, or may be performed limited to the slot in which the S-SSB is transmitted.

② Movement of PSFCH Location on Time Axis

This method shifts the corresponding PSFCH by a preset value on the time axis, when the PSFCH to be transmitted overlaps all or part of the S-SSB transmission region. For example, when it is assumed that a region following a transmission PSSCH may be empty for reasons of sensing, priority and so on, the PSFCH transmission may be collectively delayed by 1 slot. As another example, if the PSFCH after K overlaps the S-SSB region by introducing the value D, similarly to the K value, which is the interval between the PSSCH and its following PSFCH, being pre-set through RRC, PSFCH after K+D may be used. Then, the value D may be separately set through RRC or may be set to use the same value as K. At this time, when the corresponding region being still overlapped, it may be moved up until they do not overlap in the same way as K+D+D.

The methods according to the embodiments set forth in the present disclosure may be applied independently of each other, or may be combined and operated in any form. Further, throughout the specification, any new terms used in the present disclosure are used with an arbitrary name that can be easier to understand their meaning, and the present disclosure may be applied even when another term having the same meaning is actually used.

Through the methods provided in the present disclosure, it is possible to prevent the collision between a PSFCH region and an S-SSB region in the NR sidelink transmission/reception environment, or to perform an appropriate retransmission procedure even in case of such a collision.

Embodiment 4: Resource Pool Operation with a Separate Definition of PSFCH Region The transmittable location of the PSFCH allocated to the last symbols may be pre-defined in a resource pool. That is, when the transmittable location of the PSFCH is defined in advance, the PSFCH region may also coexist in the resource pool, in addition to the PSCCH and PSSCH regions. Such transmittable location of the PSFCH may be defined together with setting of the resource pool through RRC, but it may be additionally set in a resource pool designated in advance through a dedicated RRC and may be defined separately as necessary. For example, the frequency location may be defined when the resource pool is set, and the number of symbols may be set by additional information. Alternatively, it is possible to additionally set up a region to perform the actual activation among the defined location regions used in the initial setting, that is, a region to be used as the actual PSFCH among PSFCH configurable regions. More specifically, the operation may be carried out as follows.

① Limited Setting of the PSFCH Transmittable Region in the Resource Pool

Generally, it is not necessary to set a transport region for every RB, since the PSFCH is required to correspond to one transport block, respectively. In other words, at the time of initial transmission, the PSFCH may be set to be transmitted only to a location corresponding to one PSCCH transmission region, and the UE performing transmission through the remaining slots in which the corresponding region exists may perform the transmission with the corresponding region empty. Here, the symbol length of the PSFCH may be set through RRC information other than resource configuration for the initial resource pool, by which the resource allocation of the resource pool can be determined.

The PSFCH set can be emptied through rate matching or puncturing. In this case, the receiving end may similarly determine that the information has not been transmitted in the PSFCH region and then perform reception and decoding operations, when transmission has been performed in the RB and the slot including the corresponding region through the preset information.

② Activation/Deactivation of the PSFCH Transmittable Region in the Resource Pool Designated in Advance Through RRC When it is set for a transport block transmitted for broadcast and so on or not to perform an HARQ procedure, it is not necessary to use the PSFCH. Therefore, when the transmission scheme is set semi-statically in one resource pool, the PSFCH may be configured to exist only in a portion corresponding to a specific time/frequency resource. However, since this situation is most likely to change over time, only the PSFCH candidate region may be initially set and then the PSFCH region to be activated/deactivated may be indicated through additional RRC or the like. This region may be transmitted in the form of a PSFCH activation region, or this region may be indirectly transmitted in the form of a transmittable region supporting HARQ.

Embodiment 5: Delivery of Information on Existence of PSFCH Region Through DCI and SCI Regions The PSFCH region configured and activated by RRC becomes a region that none of UEs using the corresponding resource pool can be used for PSSCH transmission. At this juncture, if the number of pre-set PSFCH regions is smaller, an occasion may occur that a sufficient amount of PSFCH cannot be utilized, whereas if the pre-set number of PSFCH regions is larger, the waste of resources might occur. Accordingly, it may be considered a method of excluding only the actually allocated region from transmission resources, by transmitting related information about the region in which the actual PSFCH transmission is to be performed to the UE using the corresponding slot. Specifically, the following methods may be utilized.

① Transfer of Information on the Number of Symbols and RB Position where PSFCH is Located, when the Scheduler Indicates the Transmission Resource.

This method allows a transmitter UE to configure a transport block excepting a corresponding resource section, by transmitting together the related information on the region in which PSFCH transmission is to be performed, when indicating the slot in which the transmission is to be carried out to another UE as a sidelink transmission section, based on the PSFCH usage information that a base station or a scheduling UE knows. In case of the existing method, it may be implemented by setting the start/end symbol positions. In this case, however, the corresponding symbol cannot be used altogether, even in case there is an RB in which the PSFCH is not used among the allocated RBs. Therefore, the present disclosure provides the following methods.

According to the Method 5-1-1, when the number of symbols for PSFCH transmission is preset to k, it is possible to indicate whether to set the last symbol of the transmission block as the end of the slot or the slot end—k, by way of 1-bit indication.

According to the Method 5-1-2, when there is a PSFCH transmission resource set in advance through the above-described fourth embodiment, and the PSFCH transmission resource and the allocated PSSCH transmission resource overlap, it indicates whether to use the corresponding transmission in the resource region as PSSCH or empty it, by way of a 1-bit indication. The base station may transfer whether or not a region used by another UE for the PSFCH is in a resource indication region. According to this, although such indication may be simple, all PSFCH resources must be emptied to be transmitted even in case only some of the plurality of PSFCH resources of the overlapped region are used.

According to the Method 5-1-3, when there are k number of PSFCH transmission resources set in advance through the above-described fourth embodiment, it is possible to transfer whether to use each PSFCH (that is, availability of region), using a k-bit bitmap.

According to the Method 5-1-4, when a long transmission block (Long TB) consisting of k number of slots (k is greater than 1) is configured, it is possible to transfer whether to empty the last transmission resource of a certain slot, using a k-bit bitmap. For example, it is assumed that k is 3, PSSCH is set accordingly to the 4th to 42nd symbols, the number of PSFCH transmission symbols is 3, and the PSFCH transmission occurs in the second slot. In this case, by passing on 010, the corresponding UE may set only 4th to 25th symbols and 29th to 42nd symbols as a PSSCH transmission resource, or not send data to enter 26th to 28th symbols.

Then, according to the Method 5-1-5, by a combination of the aforementioned Methods 5-1-3 and 5-1-4, it is possible to transfer whether to empty the last transmission resource of a certain slot, using a kn-bit bitmap, when there are k preset PSFCH transmission resources in the resource pool band and is then configured a Long TB consisting of n slots, wherein n is greater than 1.

According to the Method 5-1-6, it is possible for the receiver UE to identify the transmission region successfully, by transmitting the PSFCH location information using the methods as set forth in the above Methods 5-1-1 to 5-1-4 even in case of configuring the SCI that the transmitter UE is to actually send to the receiver UE, just as if the scheduler delivers it to the transmitter UE.

② Use of Group Common Control Message

This is a method for groupcasting which PSFCH is allocated/used in a certain sidelink resource pool to every UE using the sidelink in every slot or every period in which the PSFCH is configured. With this method, the transmitter UE is able to configure the transmission region except for the PSFCH region used based on the information obtained via the corresponding group common control message and the scheduling indication message the UE itself has received. In this case, the receiver UE may reconfigure the transmission region to be received based on the SCI and the corresponding group common control message. Thus, a DCI/SCI format capable of delivering it may be defined, and the length of the corresponding message may depend on the number of PSFCHs within the resource pool.

Further, the region indicated by the corresponding format may be the same as the slot in which the corresponding DCI is transmitted, or this region may have a difference as much as DCI-SCI gap+alpha so as to utilize the corresponding information also in the transmitting end. Here, the term "DCI-SCI gap" refers to a slot distance between a control channel, through which the DCI message or the SCI message transferring the scheduling instruction message by a scheduling user is transmitted, and the PSCCH over which the transmitter UE is to transmit the SCI, being transferred via the control channel, and it may be fixed to a standard or set in common to UEs. Further, the alpha may be of a value determined by the standard specification and may not be generally required.

According to the Method 5-2-1, since the corresponding group common control message is a control message transmitted semi-persistently, it may be transmitted through a core set (CORESET), which is separately defined to lower the blind decoding (BD) probability of UEs.

The above-described fourth and fifth embodiments and their respective subordinate methods may be combined with each other and applied independently of each other, unless otherwise specified.

Through the methods provided in the present disclosure, the PSFCH transmission resources can be effectively managed, and through the PSFCH transmission, the PSFCH transmission resources can be effectively managed without deteriorating sidelink transmission performance of other users.

Hereinafter, description will be made with respect to the hardware structure of a UE and a base station being capable of implementing some or all of the embodiments as described with reference to FIGS. 1 to 15.

Figure 16:
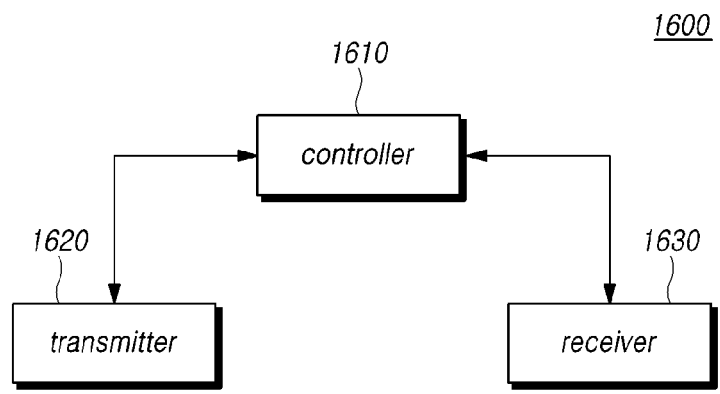
FIG. 16 is a view showing a user equipment according to an embodiment.

FIG. 16 is a diagram showing a UE 1600 according to an embodiment.

Referring now to FIG. 16, the UE 1600 according to the embodiment may include a controller 1610, a transmitter 1620, and a receiver 1630.

The controller 1610 may control the overall operation of the UE 1600 according to the method for transmitting HARQ feedback information for sidelink transmission by the UE required to carry out the disclosed invention. The transmitter 1620 may transmit uplink control information, data, and messages to a base station through a corresponding channel, and transmit sidelink control information, data, and messages to other UE through a corresponding channel. The receiver 1630 may receive downlink control information, data, and messages from the base station through a corresponding channel, and receive sidelink control information, data, and messages from other UE through a corresponding channel.

The receiver 1630 may receive configuration information on a sidelink resource pool for sidelink transmission from the base station. The base station may configure the sidelink resource pool on radio resources for sidelink transmission/reception between a UE and another UE. Here, the sidelink resource pool may be of a radio resource configured to be used to transmit and receive PSCCH, PSSCH, PSFCH, and/or the like between a UE and another UE. The receiver 1630 may receive configuration information on the sidelink resource pool from the base station through higher layer signaling.

The sidelink resource pool may have a predetermined number of consecutive sub-channels. Further, each sub-channel may be made up of a predetermined number of consecutive physical resource blocks (PRBs). The configuration information for the sidelink resource pool may include information on the number of consecutive PRBs and the number of consecutive sub-channels, and the receiver 1630 may receive the information through higher layer signaling.

For example, the transmission of HARQ feedback information through PSFCH resource may be performed based on timing gap information between reception of PSSCH and transmission of HARQ feedback information for the reception of PSSCH in a sidelink resource pool. Accordingly, the PSFCH region determined depending on the position of the PSSCH region may be often set to overlap the S-SSB region for synchronization.

In order to prevent the S-SSB region and the PSFCH region from colliding with each other, the sidelink resource pool may be configured excluding resources allocated to the S-SSB region. That is, the physical channel slot through which the S-SSB is transmitted may be excluded from the logical channel in relation to the configuration of the sidelink resource pool. Accordingly, the sidelink resource pool may be configured to include a set of slots excluding slots in which a sidelink SS/PSBCH block (S-SSB) is configured.

At this juncture, the set of slots included in the sidelink resource pool may be expressed based on sub-carrier spacing applied to the sidelink bandwidth part (SL BWP) in which the sidelink resource pool is configured.

Accordingly, while the transmitter UE and the receiver UE each transmit and receive S-SSB through the physical channel, the entire slot used for transmitting/receiving the S-SSB may be not included in the logical channel, for the sidelink resource pool used for the sidelink transmission. Therefore, the transmitter UE and the receiver UE can perform the PSFCH transmission/reception without collision with transmission of the S-SSB.

The receiver 1630 may be adapted to receive configuration information on frequency resources for transmission of a physical sidelink feedback channel (PSFCH) in a resource pool. When the PSSCH is received by the receiver 1630, the transmitter 1620 may transmit HARQ ACK/NACK feedback information corresponding to the received PSSCH to the UE transmitting the PSSCH. In order to use in transmission of HARQ ACK/NACK feedback information, the receiver 1630 may receive the configuration information for PSFCH resources.

For example, a PSFCH resource that can be used when transmitting the PSFCH may be indicated in the resource pool for sidelink transmission configured between a UE and another UE. In this case, in addition to the PSCCH region and the PSSCH region, a PSFCH region may exist in the resource pool. In particular, the receiver 1630 may receive configuration information on a frequency resource through which the PSFCH can be transmitted in the resource pool.

For example, a frequency resource for transmission of the PSFCH may be configured with a set of physical resource blocks (PRBs) in the resource pool for sidelink transmission. In this case, the receiver 1630 may receive configuration information on a frequency resource for transmission of the PSFCH, via higher layer signaling.

The transmitter 1620 may transmit HARQ feedback information for sidelink data channel (PSSCH) received from another UE, through the PSFCH resource determined based on the configuration information for the frequency resource in the resource pool.

When a PSSCH is received, the controller 1610 may configure the HARQ ACK/NACK feedback information corresponding to the received PSSCH. For example, whether to transmit the HARQ feedback information may be indicated by sidelink control information (SCI) including scheduling information for the PSSCH. That is to say, information indicative of the HARQ feedback information may be transmitted together within the SCI including resource allocation information for PSSCH transmission.

The control unit 1610 may determine one or more PRBs for the PSFCH used to transmit the HARQ feedback information from a set of PRBs by the configuration information on frequency resources in the resource pool, based on the number of sub-channels for the resource pool and the number of PSSCH slots associated with the PSFCH slot. In addition, the controller 1610 may determine the number of PSFCH resources used to transmit the HARQ feedback information.

Further, the transmission of HARQ feedback information may be performed based on timing gap information between reception of PSSCH and transmission of HARQ feedback information for the reception of PSSCH, being received via higher layer signaling. In this case, for example, the PSFCH transmission may be performed in a first slot including the PSFCH resource in the resource pool subsequent to the last slot of PSSCH reception.

That is to say, the transmitter 1620 may transmit the HARQ ACK/NACK feedback information for the received PSSCH without collision with the S-SSB, by using the PSFCH resource determined from the sidelink resource pool.

Accordingly, it is possible to provide a method and apparatus capable of preventing collision with the sidelink SS/PSBCH block (S-SSB) that may occur when transmitting the HARQ feedback information for reception of a sidelink data channel in the NR.

Figure 17:
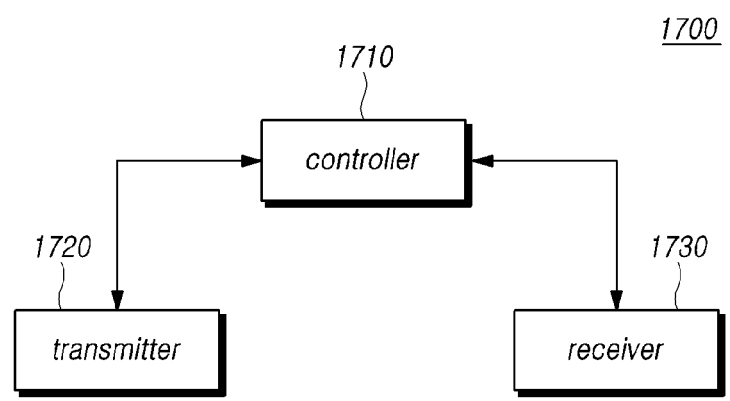
FIG. 17 is a view showing a base station according to an embodiment.

FIG. 17 is a diagram showing a base station 1700 according to an embodiment.

Referring now to FIG. 17, the base station 1700 according to the embodiment may include a controller 1710, a transmitter 1720, and a receiver 1730.

The controller 1710 may control the overall operation of the base station 1800 according to the above-described method required for the base station to control transmission of the HARQ feedback information for the sidelink transmission of a UE. The transmitter 1720 and the receiver 1730 may transmit/receive signals, messages, and data necessary to carry out the disclosed invention to and from the UE.

The transmitter 1720 may transmit configuration information on a resource pool for the sidelink transmission. The controller 1710 may configure the resource pool on radio resources for the sidelink transmission/reception between a UE and another UE. Here, the resource pool may be of a radio resource configured to be used to transmit/receive PSCCH, PSSCH, or the like between the UE and other UE. The transmitter 1720 may transmit configuration information on the resource pool to the UE through higher layer signaling.

The controller 1710 may configure the sidelink resource pool with a predetermined number of consecutive sub-channels. Further, each sub-channel may have a predetermined number of consecutive physical resource blocks (PRBs). The configuration information for the sidelink resource pool may include information on the number of consecutive PRBs and the number of consecutive sub-channels, which may be respectively indicated to the UEs by higher layer signaling.

For example, the transmission of HARQ feedback information through a PSFCH resource may be performed based on timing gap information between reception of PSSCH and transmission of the HARQ feedback information for the reception of PSSCH, in a sidelink resource pool. Accordingly, the PSFCH region determined depending on the position of the PSSCH region may be often set to overlap the S-SSB region for synchronization.

In order to prevent the S-SSB region and the PSFCH region from colliding with each other, the sidelink resource pool may be configured excluding resources allocated to the S-SSB region. That is, the physical channel slot through which the S-SSB is transmitted may be excluded from the logical channel in relation to the configuration of the sidelink resource pool. Accordingly, the sidelink resource pool may be configured to include a set of slots excluding slots in which the sidelink SS/PSBCH block (S-SSB) is configured.

In this case, the set of slots included in the sidelink resource pool may be expressed based on sub-carrier spacing applied to the sidelink bandwidth part (SL BWP) in which the sidelink resource pool is configured.

Accordingly, while the transmitter UE and the receiver UE each transmit and receive the S-SSB through a physical channel, the entire slot used for transmitting and receiving the S-SSB may not be included in the logical channel, for the sidelink resource pool used for the sidelink transmission. Thus, the transmitter UE and the receiver UE are able to perform the PSFCH transmission/reception without collision with transmission of the S-SSB.

The transmitter 1720 may transmit configuration information on frequency resources for transmission of a physical sidelink feedback channel (PSFCH) in a resource pool. When a PSSCH is received, the UE may transmit the HARQ ACK/NACK feedback information corresponding to the received PSSCH, to the UE transmitting the PSSCH. For use in transmission of the HARQ ACK/NACK feedback information, the transmitter 1720 may transmit the configuration information on PSFCH resources to the UE.

For example, a PSFCH resource that can be used when transmitting the PSFCH may be indicated in a resource pool for a sidelink transmission configured between a UE and another UE. In this case, in addition to the PSCCH region and the PSSCH region, a PSFCH region may exist in the resource pool. In particular, the transmitter 1720 may transmit the configuration information on the PSFCH resource in the sidelink resource pool to the UE.

For example, the PSFCH resource may have a set of PRBs in the resource pool for the sidelink transmission. In this case, the configuration information for the PSFCH resource may be transmitted by higher layer signaling.

The UE may transmit the HARQ feedback information on the PSSCH received from another UE through the PSFCH resource determined based on the configuration information on the frequency resource in the resource pool. When the PSSCH is received, the UE may configure the HARQ ACK/NACK feedback information corresponding to the received PSSCH. For example, whether to transmit the HARQ feedback information may be indicated by SCI including scheduling information for the PSSCH. In other words, information indicative of the HARQ feedback information may be transmitted together in the SCI including resource allocation information for the PSSCH transmission.

The UE may determine one or more PRBs for a PSFCH used to transmit the HARQ feedback information from a set of PRBs according to the configuration information for frequency resources in the resource pool, based on the number of sub-channels for the resource pool and the number of the PSSCH slots associated with the PSFCH slot. In addition, the UE may determine the number of PSFCH resources used to transmit the HARQ feedback information.

Further, the receiver 1730 may receive the HARQ feedback information based on timing gap information between reception of the PSSCH and transmission of the HARQ feedback information for the reception of the PSSCH, being received through higher layer signaling. In this case, for example, the PSFCH transmission may be performed in the first slot including the PSFCH resource in the resource pool subsequent to the last slot of PSSCH reception.

In other words, the UE may transmit the HARQ ACK/NACK feedback information for the received PSSCH, without collision with the S-SSB, by using the PSFCH resource determined from the sidelink resource pool.

Accordingly, it is possible to provide a method and apparatus for preventing collision with the sidelink SS/PSBCH block (S-SSB) that may occur when transmitting the HARQ feedback information for reception of the sidelink data channel in the NR.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a user equipment (UE) for transmitting hybrid automatic repeat request (HARQ) feedback information for sidelink transmission, the method comprising:
   receiving configuration information for a sidelink resource pool for the sidelink transmission;
   receiving a physical sidelink shared channel (PSSCH) from another UE through a resource allocated in the sidelink resource pool; and
   transmitting the HARQ feedback information for reception of the PSSCH through a physical sidelink feedback channel (PSFCH) resource allocated in the sidelink resource pool,
   wherein the sidelink resource pool includes a set of slots excluding slots in which a sidelink-synchronization signal (SS)/physical sidelink broadcast channel (PSBCH) block (S-SSB) is configured.

2. The method according to claim 1, wherein the sidelink resource pool has a plurality of consecutive sub-channels each having consecutive physical resource blocks (PRBs), and a number of the consecutive PRBs and a number of the consecutive sub-channels are indicated by higher layer signaling.

3. The method according to claim 1, wherein the set of slots is expressed based on subcarrier spacing.

4. The method according to claim 1, wherein transmission of the HARQ feedback information is indicated by sidelink control information (SCI) including scheduling information for the PSSCH.

5. The method according to claim 1, wherein the HARQ feedback information is transmitted based on timing gap information between reception of the PSSCH and transmission of the HARQ feedback information for the reception of the PSSCH, being received through higher layer signaling.

6. A method of a base station for controlling transmission of hybrid automatic repeat request (HARQ) feedback information for sidelink transmission of user equipment (UE), the method comprising:
   transmitting configuration information for a sidelink resource pool for the sidelink transmission,
   wherein the configuration information for the sidelink resource pool includes physical sidelink feedback channel (PSFCH) resource information, and
   wherein the configuration information for the sidelink resource pool is used for the UE to receive a physical sidelink shared channel (PSSCH) from another UE, and transmit the HARQ feedback information for the received PSSCH through a PSFCH resource, and the sidelink resource pool includes a set of slots excluding slots in which a sidelink-synchronization signal (SS)/physical sidelink broadcast channel (PSBCH) block (S-SSB) is configured.

7. The method according to claim 6, wherein the sidelink resource pool has a plurality of consecutive sub-channels each having consecutive physical resource blocks (PRBs), and a number of the consecutive PRBs and a number of the consecutive sub-channels are indicated by higher layer signaling.

8. The method according to claim 6, wherein the set of slots is expressed based on subcarrier spacing.

9. The method according to claim 6, wherein transmission of the HARQ feedback information is indicated by sidelink control information (SCI) including scheduling information for the PSSCH.

10. The method according to claim 6, wherein the HARQ feedback information is transmitted based on timing gap information between reception of the PSSCH and transmission of the HARQ feedback information for the reception of the PSSCH, being received through higher layer signaling.

11. A user equipment (UE) for transmitting hybrid automatic repeat request (HARQ) feedback information for sidelink transmission, comprising:
    a receiver configured to receive configuration information for a sidelink resource pool for sidelink transmission and receive a physical sidelink shared channel (PSSCH) from another UE through a resource allocated in the sidelink resource pool; and
    a transmitter configured to transmit the HARQ feedback information for reception of the PSSCH through a PSFCH resource allocated in the sidelink resource pool, wherein the sidelink resource pool includes a set of slots excluding slots in which a sidelink-synchronization signal (SS)/physical sidelink broadcast channel (PSBCH) block (S-SSB) is configured.

12. The user equipment according to claim 11, wherein the sidelink resource pool has a plurality of consecutive sub-channels each having consecutive physical resource blocks (PRBs), and a number of the consecutive PRBs and a number of the consecutive sub-channels are indicated by higher layer signaling.

13. The user equipment according to claim 11, wherein the set of slots is expressed based on subcarrier spacing.

14. The user equipment according to claim 11, wherein transmission of the HARQ feedback information is indicated by sidelink control information (SCI) including scheduling information for the PSSCH.

15. The user equipment according to claim 11, wherein the HARQ feedback information is transmitted based on timing gap information between reception of the PSSCH and transmission of the HARQ feedback information for the reception of the PSSCH, being received through higher layer signaling.

* * * * *